United States Patent
Shailendra et al.

(10) Patent No.: US 11,720,481 B2
(45) Date of Patent: Aug. 8, 2023

(54) METHOD, APPARATUS AND COMPUTER PROGRAM PRODUCT FOR PREDICTIVE CONFIGURATION MANAGEMENT OF A SOFTWARE TESTING SYSTEM

(71) Applicant: Optum, Inc., Minnetonka, MN (US)

(72) Inventors: Kumar Shailendra, Basking Ridge, NJ (US); Pawan Sharma, New Delhi (IN); Atul Subhash, Bangalore (IN); Vaishnavi K B, Mysore (IN); Sukant Arora, Bangalore (IN)

(73) Assignee: Optum, Inc., Minnetonka, MN (US)

( * ) Notice: Subject to any disclaimer, the term of this patent is extended or adjusted under 35 U.S.C. 154(b) by 49 days.

(21) Appl. No.: 17/247,463

(22) Filed: Dec. 11, 2020

(65) Prior Publication Data
US 2022/0188220 A1 Jun. 16, 2022

(51) Int. Cl.
*G06F 11/36* (2006.01)
*G06N 20/00* (2019.01)

(52) U.S. Cl.
CPC ...... *G06F 11/3688* (2013.01); *G06F 11/3684* (2013.01); *G06F 11/3692* (2013.01); *G06N 20/00* (2019.01)

(58) Field of Classification Search
CPC ............. G06F 11/3688; G06F 11/3684; G06F 11/3692; G06F 11/36–3696; G06N 20/00
See application file for complete search history.

(56) References Cited

U.S. PATENT DOCUMENTS

| 8,601,441 | B2 | 12/2013 | Kaulgud et al. |
| 9,996,451 | B2 | 6/2018 | Andrejko et al. |
| 10,534,585 | B1 | 1/2020 | Eberlein et al. |
| 10,664,696 | B2 | 5/2020 | Patil |
| 11,113,175 | B1 * | 9/2021 | Adamo ................ G06F 40/216 |

(Continued)

OTHER PUBLICATIONS

Kanewala, Upulee, James M. Bieman, and Asa Ben-Hur. "Predicting metamorphic relations for testing scientific software: a machine learning approach using graph kernels." Software testing, verification and reliability 26.3 (2016): 245-269. (Year: 2016).*

(Continued)

*Primary Examiner* — S. Sough
*Assistant Examiner* — Joanne G Macasiano
(74) *Attorney, Agent, or Firm* — Alston & Bird LLP

(57) ABSTRACT

Methods, apparatuses, systems, computing devices, computing entities, and/or the like are provided. An example method may include receiving a requirement request data object, generating at least one of a predicted complexity attribute or a predicted work track attribute corresponding to the requirement request data object, generating at least one predicted defect description attribute or at least one predicted test case description attribute corresponding to the requirement request data object, and transmitting a prediction data object that includes at least one of the predicted complexity attribute, the predicted work track attribute, the at least one predicted defect description attribute, or the at least one predicted test case description attribute. In some examples, the client device is configured to perform one or more software testing operations corresponding to the software testing task based at least in part on the prediction data object.

19 Claims, 15 Drawing Sheets

(56) References Cited

U.S. PATENT DOCUMENTS

| | | | | |
|---|---|---|---|---|
| 2014/0033176 | A1* | 1/2014 | Rama | G06F 11/3688 717/124 |
| 2015/0169428 | A1* | 6/2015 | Isman | G06F 11/36 717/124 |
| 2017/0103441 | A1* | 4/2017 | Kolb | G06F 16/951 |
| 2019/0268214 | A1* | 8/2019 | Maes | G06F 18/24 |
| 2019/0294525 | A1 | 9/2019 | Scheiner et al. | |
| 2020/0019493 | A1 | 1/2020 | Ramakrishna et al. | |
| 2020/0104360 | A1* | 4/2020 | Gahlot | G06F 16/374 |

OTHER PUBLICATIONS

Gondra, Iker. "Applying machine learning to software fault-proneness prediction." Journal of Systems and Software 81.2 (2008): 186-195. (Year: 2008).*

Shepperd, Martin, David Bowes, and Tracy Hall. "Researcher bias: The use of machine learning in software defect prediction." IEEE Transactions on Software Engineering 40.6 (2014): 603-616. (Year: 2014).*

Accili, Valentina et al. "Using Rule-Based Engine to Support Test Validation Management of Complex Safety-Critical Systems," In Proceedings of the Second International Conference On Software and Data Technologies—PL/DPS/KE/MUSE, (2007), pp. 136-143. DOI: 10.5220/0001349901360143.

Chernyak, Maxim. "Automated Software Testing In 2019: AI and ML In, Traditional QA Out?", Becoming Human: Artificial Intelligence Magazine, Aug. 16, 2019, (7 pages). [article, online]. [Retrieved from the Internet Feb. 11, 2021] URL: https://becominghuman.ai/automated-software-testing-in-2019-ai-and-ml-in-traditional-qa-out-dca3839d65.

Li, J. Jenny et al. "Advances In Test Automation For Software With Special Focus On Artificial Intelligence and Machine Learning," Software Quality Journal, (2020), vol. 28, pp. 245-248, Oct. 26, 2019. DOI: 10.1007/s11219-019-09472-3.

Wang, Chunhui et al. "Automatic Generation of Acceptance Test Cases from Use Case Specifications: An NLP-based Approach," arXiv: 1907-08490v2 [cs.SE], May 18, 2020, pp. 1-37.

* cited by examiner

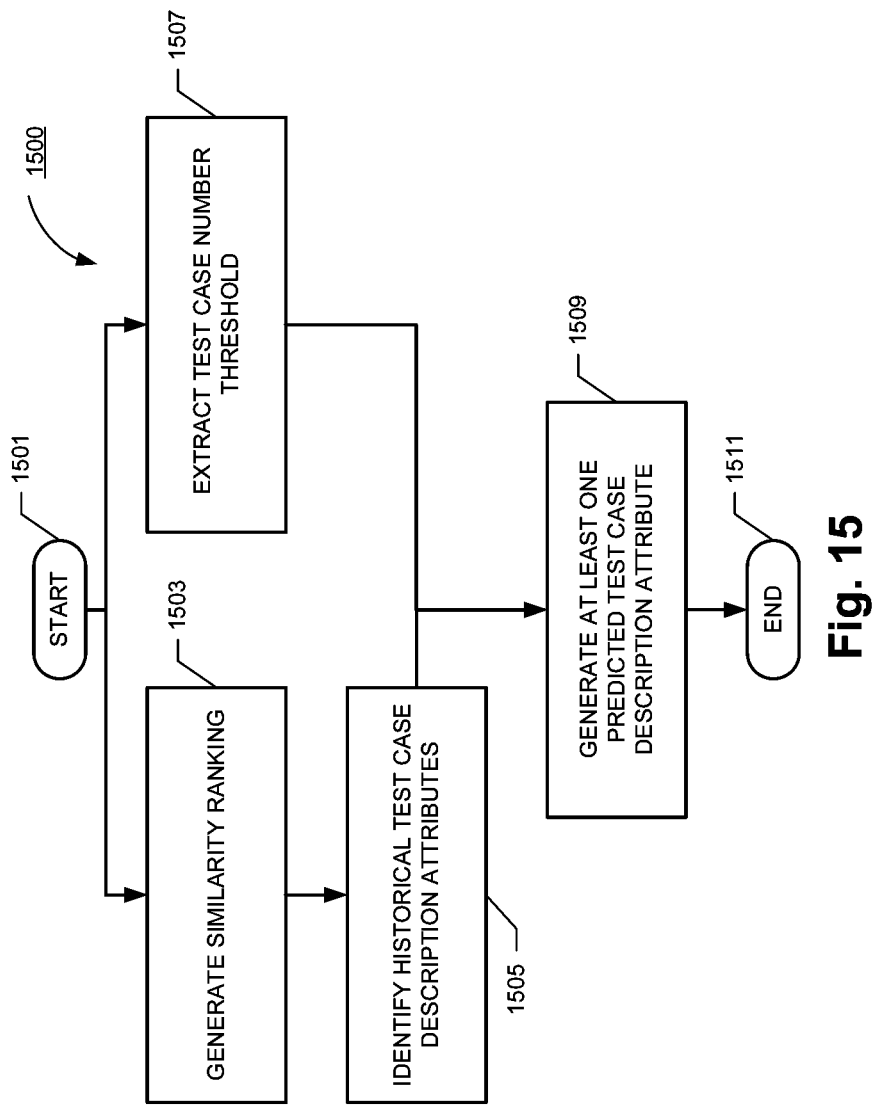

METHOD, APPARATUS AND COMPUTER PROGRAM PRODUCT FOR PREDICTIVE CONFIGURATION MANAGEMENT OF A SOFTWARE TESTING SYSTEM

TECHNOLOGICAL FIELD

Embodiments of the present disclosure generally relate to setting configuration parameters of a software testing system.

BACKGROUND

Applicant has identified many technical challenges, deficiencies and problems associated with software development and/or software testing.

"Software development" refers to activities and processes that are dedicated to creating, designing, programming, deploying and testing software applications, frameworks, and/or other software components. "Software testing" refers to activities and processes that are dedicated to analyzing, investigating and evaluating whether functionalities of a software application or component meet or satisfy a requirement of the software application or component.

Software applications and/or products may interact with many other applications and/or products through various interfaces and communication channels, including, but not limited to, Application Programming Interfaces (APIs). The complexity of software applications may grow rapidly in a nonlinear fashion. As such, the scope of software testing may expand quickly, while the time-boxed window for completing software testing is limited, which may result in delays and inefficiencies in software development.

BRIEF SUMMARY

In general, embodiments of the present disclosure provide methods, apparatuses, systems, computing devices, computing entities, and/or the like.

In accordance with various embodiments of the present disclosure, an apparatus is provided. The apparatus may comprise at least one processor and at least one non-transitory memory comprising a computer program code. The at least one non-transitory memory and the computer program code may be configured to, with the at least one processor, cause the apparatus to receive, from a client device, a requirement request data object, wherein the requirement request data object comprises at least a requirement request description attribute for a software testing task; generate, based at least in part on the requirement request description attribute and using a supervised machine learning model, at least one of a predicted complexity attribute or a predicted work track attribute corresponding to the requirement request data object; generate, based at least in part on the requirement request description attribute and using an unsupervised machine learning model, at least one predicted defect description attribute or at least one predicted test case description attribute corresponding to the requirement request data object; and transmit, to the client device, a prediction data object. In some embodiments, the prediction data object may comprise at least one of the predicted complexity attribute, the predicted work track attribute, the at least one predicted defect description attribute, or the at least one predicted test case description attribute. In some embodiments, the client device is configured to perform one or more software testing operations corresponding to the software testing task based at least in part on the prediction data object.

In some embodiments, subsequent to receiving the requirement request data object from the client device, the at least one non-transitory memory and the computer program code may be configured to, with the at least one processor, cause the apparatus to further: identify, based at least in part on a domain-specific rule associated with the requirement request data object, a domain-specific abbreviation text from the requirement request description attribute; and convert, based at least in part on the domain-specific rule, the domain-specific abbreviation text to a domain-specific expansion text.

In some embodiments, the at least one non-transitory memory and the computer program code may be configured to, with the at least one processor, cause the apparatus to further: retrieve at least one of a historical requirement data object, a historical defect data object, or a historical test case data object; generate a historical dataset based at least in part on the at least one of the historical requirement data object, the historical defect data object, or the historical test case data object; and store, in a database, the historical dataset.

In some embodiments, the historical requirement data object may comprise at least one of a historical requirement identifier attribute, a historical requirement description attribute, or a work track attribute.

In some embodiments, the historical defect data object may comprise at least one of a historical defect identifier attribute, a historical defect description attribute, or a work track attribute.

In some embodiments, the historical test case data object may comprise at least one of a historical test case identifier attribute, a historical test case description attribute, or a work track attribute.

In some embodiments, when generating the historical dataset, the at least one non-transitory memory and the computer program code may be configured to, with the at least one processor, cause the apparatus to further: merge at least two of a historical requirement description attribute of the historical requirement data object, a historical defect description attribute of the historical defect data object, or a historical test case description attribute of the historical test case data object.

In some embodiments, when generating at least one of the predicted complexity attribute or the predicted work track attribute corresponding to the requirement request data object, the at least one non-transitory memory and the computer program code may be configured to, with the at least one processor, cause the apparatus to further: retrieve the historical dataset from the database; and generate at least one of the predicted complexity attribute or the predicted work track attribute based at least in part on the requirement request description attribute, the historical dataset and the supervised machine learning model.

In some embodiments, the requirement request data object may further comprise a confidence score threshold attribute indicating a confidence score threshold. In some embodiments, the at least one non-transitory memory and the computer program code may be configured to, with the at least one processor, cause the apparatus to further: generate a candidate work track attribute based at least in part on the requirement request description attribute, the historical dataset and the supervised machine learning model; calculate a confidence score associated with the candidate work track attribute; and determine whether the confidence score satisfies the confidence score threshold.

In some embodiments, when generating the at least one predicted defect description attribute or the at least one predicted test case description attribute corresponding to the requirement request data object, the at least one non-transitory memory and the computer program code may be configured to, with the at least one processor, cause the apparatus to further: generate, based on the requirement request description attribute, a requirement request feature vector set; calculate, based on the unsupervised machine learning model, a plurality of similarity scores associated with the requirement request feature vector set and the historical dataset; and determine, based at least in part on the plurality of similarity scores, the at least one predicted defect description attribute or the at least one predicted test case description attribute.

In some embodiments, the historical dataset may indicate a plurality of attribute correlations between a plurality of historical requirement description attributes and a plurality of historical defect description attributes. In some embodiments, the plurality of similarity scores may indicate corresponding similarity levels between the requirement request description attribute and the plurality of historical requirement description attributes.

In some embodiments, the requirement request data object may comprise a defect number threshold attribute indicating a defect number threshold. In some embodiments, the at least one non-transitory memory and the computer program code may be configured to, with the at least one processor, cause the apparatus to further: generate a similarity ranking of the plurality of historical requirement description attributes based on the plurality of similarity scores; identify the plurality of historical defect description attributes corresponding to the plurality of historical requirement description attributes in the similarity ranking based on the plurality of attribute correlations; and generate the at least one predicted defect description attribute based on the similarity ranking, the plurality of historical defect description attributes, and the defect number threshold.

In some embodiments, the historical dataset may indicate a plurality of attribute correlations between a plurality of historical requirement description attributes and a plurality of historical test case description attributes. In some embodiments, the plurality of similarity scores may indicate corresponding similarity levels between the requirement request description attribute and the plurality of historical requirement description attributes.

In some embodiments, the requirement request data object may comprise a test case number threshold attribute indicating a test case number threshold. In some embodiments, the at least one non-transitory memory and the computer program code may be configured to, with the at least one processor, cause the apparatus to further: generate a similarity ranking of the plurality of historical requirement description attributes based on the plurality of similarity scores; identify the plurality of historical test case description attributes corresponding to the plurality of historical requirement description attributes in the similarity ranking based on the plurality of attribute correlations; and generate the at least one predicted test case description attribute based on the similarity ranking, the plurality of historical test case description attributes, and the test case number threshold.

In accordance with various embodiments of the present disclosure, a computer-implemented method is provided. The computer-implemented method may comprise receiving, from a client device and by one or more processors, a requirement request data object, wherein the requirement request data object comprises at least a requirement request description attribute; generating, based at least in part on the requirement request description attribute and using a supervised machine learning model and by the one or more processors, a predicted complexity attribute and a predicted work track attribute corresponding to the requirement request data object; generating, based at least in part on the requirement request description attribute and an unsupervised machine learning model and by the one or more processors, at least one predicted defect description attribute and at least one predicted test case description attribute corresponding to the requirement request data object; and transmitting, to the client device and by the one or more processors, a prediction data object. In some embodiments, the prediction data object may comprise the predicted complexity attribute, the predicted work track attribute, the at least one predicted defect description attribute, and the at least one predicted test case description attribute.

In accordance with various embodiments of the present disclosure, a computer program product is provided. The computer program product may comprise at least one non-transitory computer-readable storage medium having computer-readable program code portions stored therein. The computer-readable program code portions may comprise an executable portion configured to: receive, from a client device, a requirement request data object, wherein the requirement request data object comprises at least a requirement request description attribute; generate, based at least in part on the requirement request description attribute and a supervised machine learning model, at least one of a predicted complexity attribute or a predicted work track attribute corresponding to the requirement request data object; generate, based at least in part on the requirement request description attribute and an unsupervised machine learning model, at least one predicted defect description attribute or at least one predicted test case description attribute corresponding to the requirement request data object; and transmit, to the client device, a prediction data object.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 3:
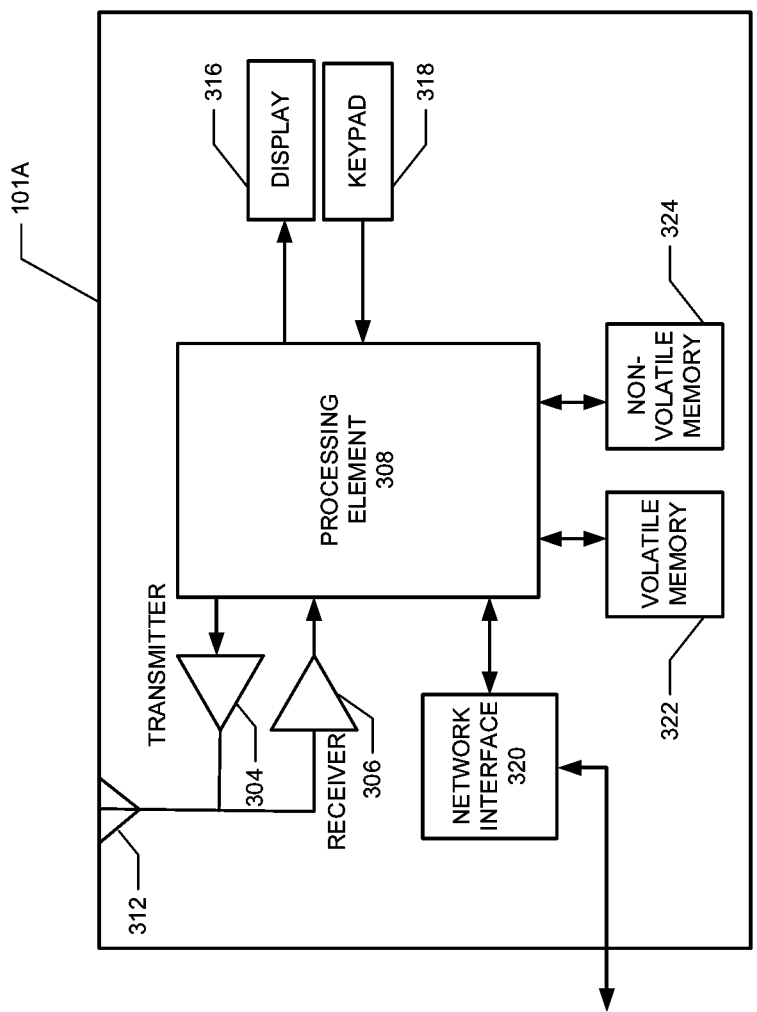

FIG. 3 is a schematic representation of an example user computing entity in accordance with various embodiments of the present disclosure; and FIGS. 4, 5, 6, 7, 8, 9, 10, 11, 12, 13, 14, and 15 provide example flowcharts and diagrams illustrating example steps, processes, procedures, and/or operations associated with an example software testing platform/system, in accordance with various embodiments of the present disclosure.

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment).

I. COMPUTER PROGRAM PRODUCTS, METHODS, AND COMPUTING ENTITIES

Embodiments of the present disclosure may be implemented as computer program products that comprise articles of manufacture. Such computer program products may include one or more software components including, for example, applications, software objects, methods, data structures, and/or the like. A software component may be coded in any of a variety of programming languages. An illustrative programming language may be a lower-level programming language such as an assembly language associated with a particular hardware architecture and/or operating system platform/system. A software component comprising assembly language instructions may require conversion into executable machine code by an assembler prior to execution by the hardware architecture and/or platform/system. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Additionally, or alternatively, embodiments of the present disclosure may be implemented as a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1:
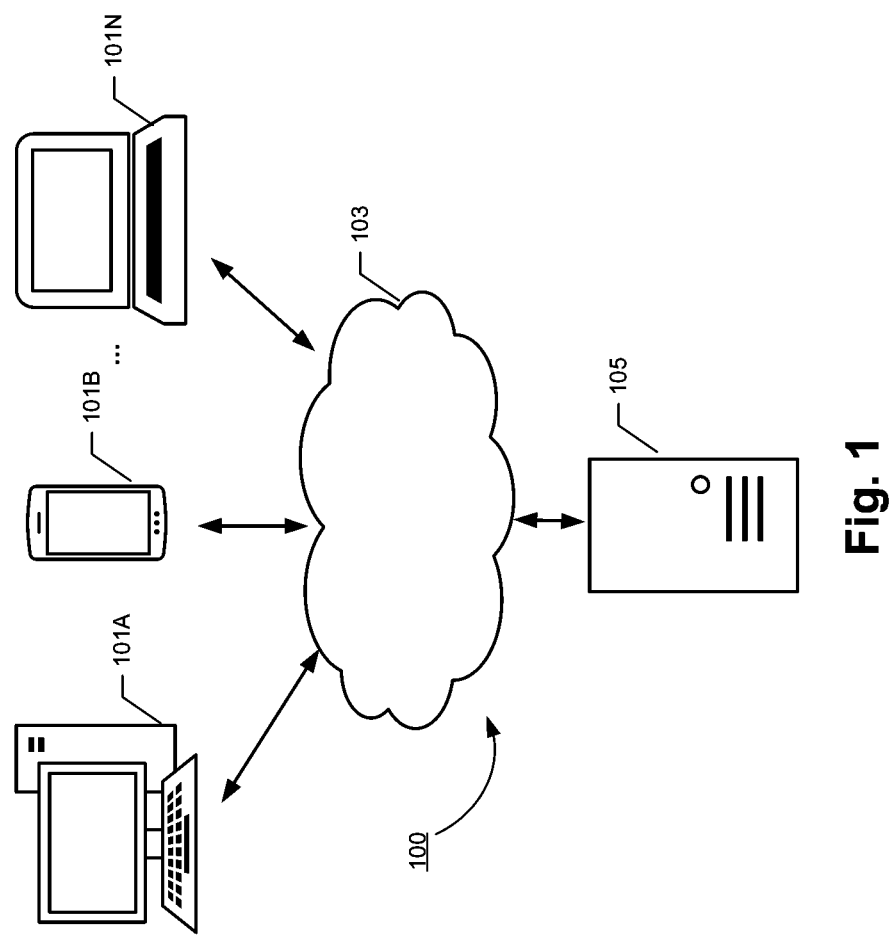
FIG. 1 is a diagram of an example software testing platform/system that can be used in accordance with various embodiments of the present disclosure.

FIG. 1 provides an illustration of a software testing platform/system 100 that can be used in conjunction with various embodiments of the present disclosure. As shown in FIG. 1, the software testing platform/system 100 may comprise one or more subject matter expertise (SME) computing entities 105, one or more user computing entities 101A, 101B, ... 101N, and one or more networks 103. Each of the components of the software testing platform/system 100 may be in electronic communication with, for example, one another over the same or different wireless or wired networks 103 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

a. Exemplary SME Computing Entity

Figure 2:
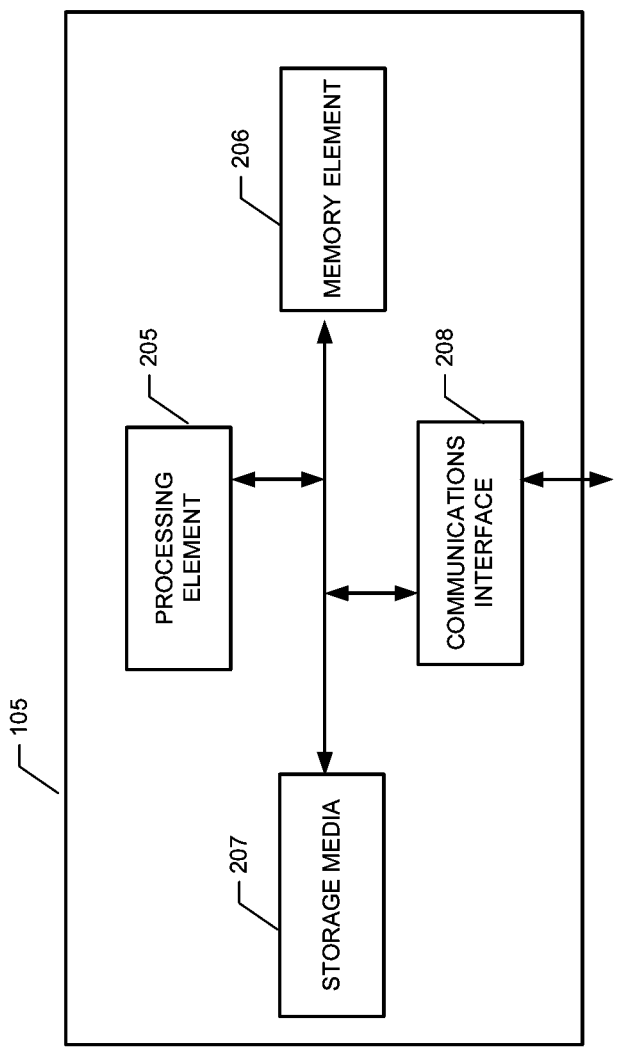
FIG. 2 is a schematic representation of an example subject matter expertise (SME) computing entity in accordance with various embodiments of the present disclosure.

FIG. 2 provides a schematic of a SME computing entity 105 according to one embodiment of the present disclosure. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

As indicated, in one embodiment, the SME computing entity 105 may also include one or more network and/or communications interface 208 for communicating with various computing entities, such as by communicating data, content, information, and/or similar terms used herein that can be transmitted, received, operated on, processed, displayed, stored, and/or the like. For instance, the SME computing entity 105 may communicate with other SME computing entities 105, one or more user computing entities 101A-101N, and/or the like.

As shown in FIG. 2, in one embodiment, the SME computing entity 105 may include or be in communication with one or more processing elements 205 (also referred to as processors, processing circuitry, and/or similar terms used herein interchangeably) that communicate with other elements within the SME computing entity 105 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the SME computing entity 105 may further include or be in communication with volatile media (also referred to as volatile storage, memory, memory storage, memory circuitry and/or similar terms used herein interchangeably). In one embodiment, the volatile storage or memory may also include one or more memory element 206 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 206 may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205 as shown in FIG. 2 and/or the processing element 308 as described in connection with FIG. 3. Thus, the databases, database instances, database management system entities, data, applications, programs, program modules, scripts, source code, object code, byte code, compiled code, interpreted code, machine code, executable instructions, and/or the like may be used to control certain aspects of the operation of the SME computing entity 105 with the assistance of the processing element 205 and operating system.

In one embodiment, the SME computing entity 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or storage media 207 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 207 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Storage media 207 may also be embodied as a data storage device or devices, as a separate database server or servers, or as a combination of data storage devices and separate database servers. Further, in some embodiments, storage media 207 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery prediction system may be stored. Further, the information/data required for the operation of the recovery prediction system may also be partially stored in the cloud data storage system and partially stored in a locally maintained data storage system. More specifically, storage media 207 may encompass one or more data stores configured to store information/data usable in certain embodiments.

As indicated, in one embodiment, the SME computing entity 105 may also include one or more network and/or communications interface 208 for communicating with various computing entities, such as by communicating data, content, information, and/or similar terms used herein interchangeably that can be transmitted, received, operated on, processed, displayed, stored, and/or the like. For instance, the SME computing entity 105 may communicate with computing entities or communication interfaces of other SME computing entities 105, user computing entities 101A-101N, and/or the like.

As indicated, in one embodiment, the SME computing entity 105 may also include one or more network and/or communications interface 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the SME computing entity 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The SME computing entity 105 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the SME computing entity's components may be located remotely from components of other SME computing entities 105, such as in a distributed system. Furthermore, one or more of the components may be aggregated and additional components performing functions described herein may be included in the SME computing entity 105. Thus, the SME computing entity 105 can be adapted to accommodate a variety of needs and circumstances.

b. Exemplary User Computing Entity

FIG. 3 provides an illustrative schematic representative of one of the user computing entities 101A to 101N that can be used in conjunction with embodiments of the present disclosure. As will be recognized, the user computing entity may be operated by an agent and include components and features similar to those described in conjunction with the SME computing entity 105. Further, as shown in FIG. 3, the user computing entity may include additional components and features. For example, the user computing entity 101A can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a SME computing entity 105, another user computing entity 101A, and/or the like. In this regard, the user computing entity 101A may be capable of operating with one or more air interface standards, communication protocols, modulation types, and access types. More particularly, the user computing entity 101A may comprise a network interface 320, and may operate in accordance with any of a number of wireless communication standards and protocols. In a particular embodiment, the user computing entity 101A may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 101A can communicate with various other entities using Unstructured Supplementary Service data (USSD), Short Message Service (SMS), Multimedia Messaging Service (MMS), Dual-Tone Multi-Frequency (DTMF) Signaling, Subscriber Identity Module Dialer (SIM dialer), and/or the like. The user computing entity 101A can also download changes, add-ons, and updates, for instance, to its firmware, software (e.g., including executable instructions, applications, program modules), and operating system.

According to one embodiment, the user computing entity 101A may include location determining aspects, devices, modules, functionalities, and/or similar words used herein interchangeably. For example, the user computing entity 101A may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 101A may include indoor positioning aspects, such as a location module adapted to acquire, for example, latitude, longitude, altitude, geocode, course, direction, heading, speed, time, date, and/or various other information/data. Some of the indoor aspects may use various position or location technologies including Radio-Frequency Identification (RFID) tags, indoor beacons or transmitters, Wi-Fi access points, cellular towers, nearby computing devices (e.g., smartphones, laptops) and/or the like. For instance, such technologies may include iBeacons, Gimbal proximity beacons, Bluetooth Low Energy (BLE) transmitters, Near Field Communication (NFC) transmitters, and/or the like. These indoor positioning aspects can be used in a variety of settings to determine the location of someone or something to within inches or centimeters.

The user computing entity 101A may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 101A to cause display or audible presentation of information/data and for user interaction therewith via one or more user input interfaces. The user output interface may be updated dynamically from communication with the SME computing entity 105. The user input interface can comprise any of a number of devices allowing the user computing entity 101A to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 101A and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 101A can collect information/data, user interaction/input, and/or the like.

The user computing entity 101A can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entities 101A-101N.

c. Exemplary Networks

In one embodiment, the networks 103 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 103 may have any suitable communication range associated therewith and may include, for example, global networks (e.g., the Internet), MANs, WANs, LANs, or PANs. In addition, the networks 103 may include medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms/systems provided by network providers or other entities.

Further, the networks 103 may utilize a variety of networking protocols including, but not limited to, TCP/IP based networking protocols. In some embodiments, the protocol is a custom protocol of JavaScript Object Notation (JSON) objects sent via a Websocket channel. In some embodiments, the protocol is JSON over RPC, JSON over REST/HTTP, and/or the like.

III. EXEMPLARY OPERATION

Various embodiments of the present invention may provide innovative techniques for improving efficiency and reliability of performing software testing operations by utilizing predictive data analysis techniques to infer configurational parameters of performing such operations (including, but not limited to, work track, defect, test case, and/or complexity). In doing so, various embodiments of the present invention may reduce efficiency and reliability bottlenecks that undermine the effectiveness of various software development solutions, and thus may make substantial technical contributions to improving software development platforms and software development solutions. Examples of technologically advantageous aspects of various embodiments of the present invention include: reducing dependency and work load on the human subject matter expert, as various embodiments identify and recommend similar artefacts which a human subject matter expert would have provided but with a greater precision and continuous availability to all the users; proactively reducing defects, as various embodiments recommend potential failure points with the implementation of a given requirement, which in turn makes the testing process more robust as the user will know beforehand some of the defects to look for in the application; decreasing error in work track selection, as various embodiments reduce errors in work track selection incurred by limitations of human decision-making; and providing an automated subject matter expert for a subject matter expert, as various embodiments serve as a virtual subject matter expert for a human subject matter expert herself.

Reference will now be made to FIGS. 4, 5, 6, 7, 8, 9, 10, 11, 12, 13, 14, and 15, which provide flowcharts illustrating example steps, processes, procedures, and/or operations associated with a software testing platform/system in accordance with various embodiments of the present disclosure.

While example embodiments of the present disclosure may be described in the context of software testing, as will be recognized, embodiments of the present disclosure are not limited to this context only.

a. Exemplary Prediction Data Object Generation

As described above, there are many technical challenges, deficiencies and problems associated with software application development and/or testing. In many instances, a human subject matter expert may be involved in software development and/or software testing. The human subject matter expert may be an individual who has knowledge, experience, expertise and/or authority in the technical topic(s), domain(s), subject(s) and/or business area(s) associated with the software application or component that is being developed and/or tested. For example, many software testing processes may rely on and/or leverage a human subject matter expert's knowledge, experience, expertise and/or authority to guide resources to functional areas (for example, carrying our test cases) and examine potential faulty areas (i.e. identifying defects).

However, the limited number of human subject matter experts may be a bottleneck in software development and/or software testing. For example, other activities and processes in software development and/or software testing may need to be paused until a human subject matter expert is available to provide guidance. As a result of dependency and reliance on human subject matter experts, software testing platforms/systems may encounter scheduled and/or unscheduled delays, increased communication overhead, and high resource cost for delayed start or rework.

To address these technical challenges, example embodiments of the present disclosure may provide artificially intelligent subject matter expertise. For example, example embodiments of the present disclosure may generate a prediction data object based on a requirement request data object associated with a software development process or a software testing process, and the prediction data object may include at least one of a predicted complexity attribute, a predicted work track attribute, a predicted defect description attribute, or a predicted test case description attribute for the software testing process.

In the present disclosure, the term "data object" refers to a data structure that represents one or more functionalities and/or characteristics associated with data and/or information. In some embodiments, a data object may be received by a SME computing entity. For example, the data object may be generated by a user computing entity and transmitted to the SME computing entity. In some embodiments, a data object may be generated by a SME computing entity (for example, based on one or more inputs received from a user computing entity).

Figure 4:
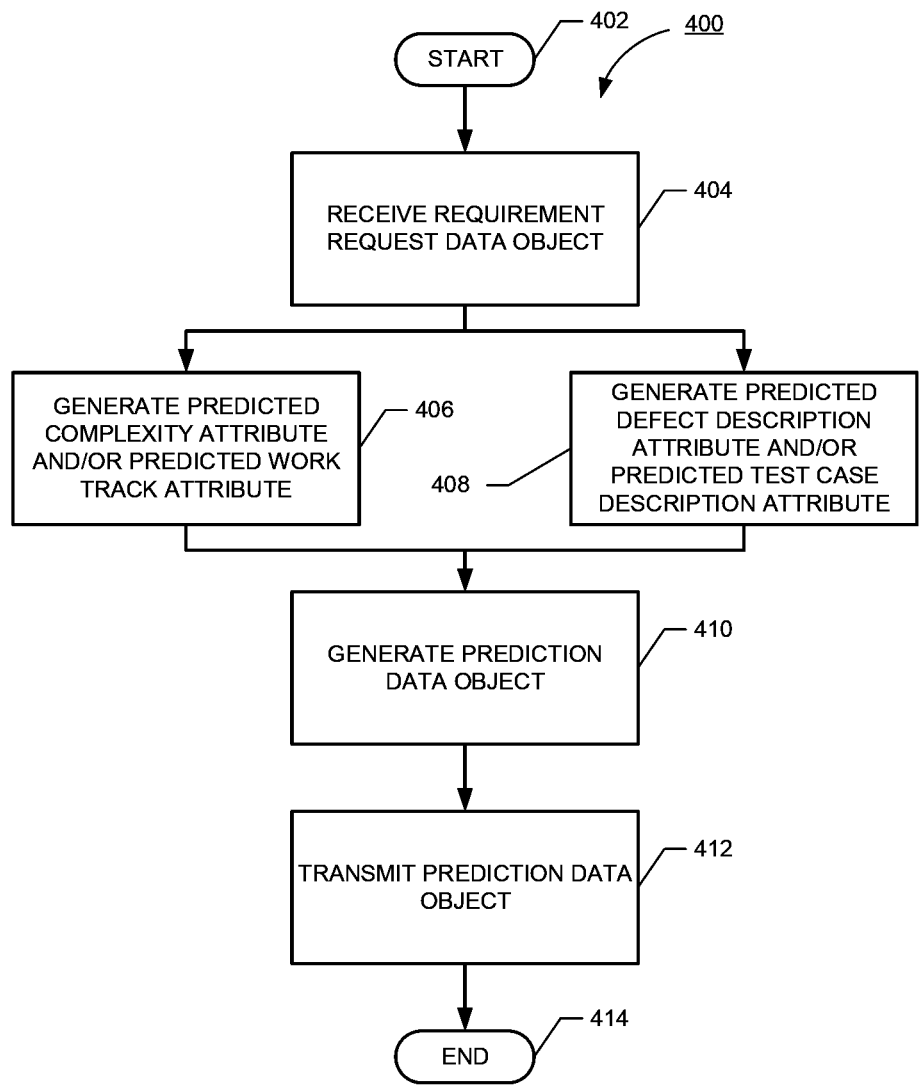

Referring now to FIG. 4, an example method 400 illustrates example generation of example prediction data object in accordance with embodiments of the present disclosure.

The example method 400 starts at step/operation 402.

At step/operation 404, a computing entity (such as the SME computing entity 105 described above in connection with FIG. 1 and FIG. 2) may include means (such as the communications interface 208 of the SME computing entity 105 described above in connection with FIG. 2) for receiving a requirement request data object from, for example, a client device (such as the user computing entities 101A, 101B, . . . 101N described above in connection with FIG. 1 and FIG. 3).

In the present disclosure, the term "requirement request data object" refers to a data object that may provide one or more descriptions, documentations and/or specifications indicating a user's request for physical and/or functional requirement(s) or need that one or more software applications, components, frameworks, products, services, and/or like aim to satisfy or meet. For example, the requirement request data object may comprise at least a requirement request description attribute that may provide such descriptions, documentations and/or specifications. For example, the requirement request description attribute may be for a software testing task (i.e. an activity related to software testing that needs to be completed). In some embodiments, the requirement request description attribute may comprise a numeric value, an alphabetic value, an alphanumeric value, a text string, an American Standard Code for Information Interchange (ASCII) text, a pointer, a memory address, and/or the like.

For example, the requirement request description attribute may provide one or more descriptions, documentations and/or specifications of one or more business requirements. In such an example, the requirement request description attribute may describe, document, and/or specify, for example but not limited to, primary use, scope, vision, overview, benefit, user base, and/or the like of one or more software applications, components, frameworks, products, and services.

Additionally, or alternatively, the requirement request description attribute may provide one or more descriptions, documentations and/or specifications of one or more user requirements. In such an example, the requirement request description attribute may describe, document, and/or specify, for example but not limited to, use cases, user scenarios, and/or user expectation of software applications, components, frameworks, products, services, and/or like. For example, the requirement request description attribute and/or the requirement request data object may be in an universal data format, such as, but not limited to, user requirement document (URD) format.

Additionally, or alternatively, the requirement request description attribute may provide one or more descriptions, documentations and/or specifications of one or more system requirements. In such an example, the requirement request description attribute may describe, document, and/or specify, for example but not limited to, functions, services, and/or operational constraints for one or more components, products, and/or services of a software application or framework. For example, the requirement request description attribute may describe, document, and/or specify one or more functional requirements, which may define and/or describe functions and/or features of one or more components, products, and/or services. As another example, the requirement request description attribute may describe, document, and/or specify one or more non-functional requirements, which may define and/or describe standards, rules and/or regulations that one or more components, products, and/or services must adhere under expected/unexpected conditions and environment.

In various embodiments of the present disclosure, an example requirement request data object may be in various forms. As an example, an example requirement request data object may be in the form of an Application Programming Interface (API) request. For example, a computing entity (such as the SME computing entity 105 described above in connection with FIG. 1 and FIG. 2) may include means (such as the communications interface 208 of the SME computing entity 105 described above in connection with FIG. 2) for receiving the following requirement request data object from a client device (such as the user computing entities 101A, 101B, . . . 101N described above in connection with FIG. 1 and FIG. 3):

{"requirement":"The system shall use MA-21 disability information (stored in the HIX), for all the applications that have been released for MassHealth redetermination for the purpose of MassHealth redeterminations", "diff":0.1, "num_defects":5, "num_testcases":5}

In the above example, the example requirement request data object is in the form of an API request block. The "requirement" value indicates that the requirement request description attribute of the requirement request data object is "The system shall use MA-21 disability information (stored in the HIX), for all the applications that have been released for MassHealth redetermination for the purpose of MassHealth redeterminations."

In some embodiments, an example requirement request data object may comprise one or more attributes in addition to or in alternative of a requirement request description attribute. For example, an example requirement request data object may comprise one or more of a confidence score threshold attribute, a defect number threshold attribute, and/or a test case number threshold attribute.

For example, the requirement request data object may comprise a confidence score threshold attribute indicating a confidence score threshold. The confidence score threshold may indicate a minimum confidence score requirement for one or more outputs generated by a machine learning model, details of which are described herein (including, but not limited to, those described in connection with at least FIG. 10). Continuing from the example requirement request data object above, the "diff" value indicates that the confidence score threshold attribute of the requirement request data object is 0.1 (or 10%). In this example, one or more outputs generated by a machine learning model must have a minimum of 10% confidence score to be included in a prediction data object, details of which are described herein (including, but not limited to, those described in connection with at least FIG. 10).

In some embodiments, the requirement request data object may comprise a defect number threshold attribute indicating a defect number threshold. The defect number threshold may indicate a user request on the number of predicted defect description attributes to be generated by a computing entity (such as the SME computing entity 105 described above in connection with FIG. 1 and FIG. 2), details of which are described herein (including, but not limited to, those described in connection with at least FIG. 13). Continuing from the example requirement request data object above, the "num_defects" value indicates that the defect number threshold attribute of the requirement request data object is 5. In this example, the computing entity (such as the SME computing entity 105 described above in connection with FIG. 1 and FIG. 2) is requested to generate five predicted defect description attributes in response to receiving the requirement request data object, details of which are described herein (including, but not limited to, those described in connection with at least FIG. 13).

In some embodiments, the requirement request data object may comprise a test case number threshold attribute indicating a test case number threshold. The test case number threshold may indicate a user request on the number of predicted test case attributes to be generated by a computing entity (such as the SME computing entity 105 described above in connection with FIG. 1 and FIG. 2), details of which are described herein (including, but not limited to, those described in connection with at least FIG. 15). Continuing from the example requirement request data object above, the "num_testcases" value indicates that the test case number threshold attribute of the requirement request data object is 5. In this example, the computing entity (such as the SME computing entity 105 described above in connection with FIG. 1 and FIG. 2) is requested to generate five predicted test case description attributes in response to receiving the requirement request data object, details of which are described herein (including, but not limited to, those described in connection with at least FIG. 15).

While the description above provides some example attributes of a requirement request data object, it is noted that the scope of the present disclosure is not limited to the description above. In some examples, an example requirement request data object may comprise one or more additional and/or alternative attributes, or less attributes than those described above.

Similarly, while the description above provides an example requirement request data object in the form of an API request, it is noted that the scope of the present disclosure is not limited to the description above. In some examples, an example requirement request data object may be in other forms and/or other formats.

As described above, an example requirement request data object may be generated by a client device (such as the user computing entities 101A, 101B, . . . 101N described above in connection with FIG. 1 and FIG. 3). The client device may transmit the example requirement request data object to a computing entity (such as the SME computing entity 105 described above in connection with FIG. 1 and FIG. 2). Subsequent to receiving the example requirement request data object, the computing entity may store the example requirement request data object in a storage device associated with the computing entity.

For example, referring back to FIG. 2, the example requirement request data object may be stored in the storage media 207 of the SME computing entity 105. In some embodiments, the example requirement request data object may be stored in a storage device that is external to the SME computing entity 105. For example, the example requirement request data object may be stored in a data repository (such as a database) that is external to the SME computing entity 105 and/or the software testing platform/system as illustrated in FIG. 1. In such an example, the data repository may be in electronic communication with the SME computing entity 105, and the SME computing entity 105 may electronically retrieve the example requirement request data object from the data repository.

Referring back to FIG. 4, at step/operation 406, a computing entity (such as the SME computing entity 105 described above in connection with FIG. 1 and FIG. 2) may include means (such as the processing element 205 of the SME computing entity 105 described above in connection with FIG. 2) for generating at least one of a predicted complexity attribute or a predicted work track attribute corresponding to the requirement request data object received at step/operation 404. For example, the computing entity may generate a predicted complexity attribute and a predicted work track attribute.

In the present disclosure, the term "predicted complexity attribute" refers to one or more descriptions, documentations and/or specifications that indicate a predicted complexity level associated with a requirement as determined by a computing entity (such as the SME computing entity 105 described above in connection with FIG. 1 and FIG. 2). For example, the predicted complexity attribute may comprise a numeric value, an alphabetic value, an alphanumeric value, a text string, an ASCII text, a pointer, a memory address, and/or the like.

In some embodiments, the computing entity may generate the predicted complexity attribute based at least in part on the requirement request description attribute of the requirement request data object and using a supervised machine learning model (such as, but not limited to, ensemble models including Random Forest, Naïve Bayes, Logistic Regression, etc.), details of which are described herein (including, but not limited to, those described in connection with at least FIG. 5 to FIG. 10).

In the present disclosure, the term "predicted work track attribute" refers to one or more descriptions, documentations and/or specifications that indicate a predicted work track associated with a requirement as determined by a computing entity (such as the SME computing entity 105 described above in connection with FIG. 1 and FIG. 2). The term "work track" refers to one or more components, modules, subsystems, and/or like of a software application and/or product that may be affected or impacted by a requirement. For example, a work track may correspond to one or more potential focus areas, functions and/or modules of one or more software applications, components, frameworks, products, and/or services that are under change due to a requirement.

As an example, TABLE 1 below provides some example work tracks associated with a software application related to healthcare:

TABLE 1

Example Work Tracks

Periodic Data Matching
Eligibility Verification
Address Verification
UI/UX

In some embodiments, an example predicted work track attribute may comprise a numeric value, an alphabetic value, an alphanumeric value, a text string, an ASCII text, a pointer, a memory address, and/or the like.

In some embodiments, the computing entity may generate the predicted work track attribute based at least in part on the requirement request description attribute of the requirement request data object and using a supervised machine learning model (such as, but not limited to, ensemble models including Random Forest, Naïve Bayes, Logistic Regression, etc.), details of which are described herein (including, but not limited to, those described in connection with at least FIG. 5 to FIG. 10).

At step/operation 408, a computing entity (such as the SME computing entity 105 described above in connection with FIG. 1 and FIG. 2) may include means (such as the processing element 205 of the SME computing entity 105 described above in connection with FIG. 2) for generating at least one predicted defect description attribute or at least one predicted test case description attribute corresponding to the requirement request data object.

In the present disclosure, the term "predicted defect description attribute" refers to one or more descriptions, documentations and/or specifications that indicate a predicted defect associated with a requirement as determined by a computing entity (such as the SME computing entity 105 described above in connection with FIG. 1 and FIG. 2). The term "defect" refers to one or more conditions, scenarios, and/or environment where one or more software applications, components, frameworks, products, and/or services do not meet or satisfy one or more requirements. For example, an example defect may be an arithmetic defect in one or more arithmetic expressions of a programming code of software application(s), component(s), framework(s), product(s), service(s), and/or like. As another example, an example defect may be a logical defect corresponds to a logic error of a programming code implementation. Additionally, or alternatively, an example defect may be of other types, including, but not limited to, an interface defect, a syntax defect, a multithreading defect, and/or the like. In some embodiments, a defect may indicate challenges associated with a test case (the term "test case" is defined herein).

In some embodiments, an example predicted defect description attribute may comprise a numeric value, an alphabetic value, an alphanumeric value, a text string, an ASCII text, a pointer, a memory address, and/or the like.

In some embodiments, the computing entity may generate the predicted defect description attribute based at least in part on the requirement request description attribute of the requirement request data object and using an unsupervised machine learning model (such as, but not limited to, a distance-based unsupervised machine learning model), details of which are described herein (including, but not limited to, those described in connection with at least FIG. 5 to FIG. 7 and FIG. 11 to FIG. 13).

In the present disclosure, the term "predicted test case description attribute" refers to one or more descriptions, documentations and/or specifications that indicate a predicted test case associated with a requirement as determined by a computing entity (such as the SME computing entity 105 described above in connection with FIG. 1 and FIG. 2). The term "test case" refers to one or more inputs, variables, execution conditions and/or procedures for determining whether one or more software applications, components, frameworks, products, and/or services satisfy or meet a requirement. For example, a test case may describe or define a test to be executed to achieve an objective associated with software testing, to exercise a program path, and/or to verify compliance with a requirement.

In some embodiments, an example predicted test case description attribute may comprise a numeric value, an alphabetic value, an alphanumeric value, a text string, an ASCII text, a pointer, a memory address, and/or the like.

In some embodiments, the computing entity may generate the predicted test case description attribute based at least in part on the requirement request description attribute of the requirement request data object and using an unsupervised machine learning model (such as, but not limited to, a distance-based unsupervised machine learning model), details of which are described herein (including, but not limited to, those described in connection with at least FIG. 5 to FIG. 7, FIG. 11, and FIG. 14 to FIG. 15).

Referring back to FIG. 4, at step/operation 410, a computing entity (such as the SME computing entity 105 described above in connection with FIG. 1 and FIG. 2) may include means (such as the processing element 205 of the SME computing entity 105 described above in connection with FIG. 2) for generating a prediction data object.

In the present disclosure, the term "prediction data object" refers to a data object that may provide one or more descriptions, documentations and/or specifications associated with one or more predicted subject matters related to a requirement. For example, the predicted subject matters may include, but not limited to, one or more of a complexity level associated with the requirement, one or more work tracks associated with the requirement, one or more defects associated the requirement, and/or one or more test cases associated with the reequipment. Accordingly, the prediction data object may comprise one or more of a predicted complexity attribute, a predicted work track attribute, at least one predicted defect description attribute, and/or at least one predicted test case description attribute. For example, the prediction data object may comprise a predicted complexity attribute, one or more predicted work track attributes, one or more predicted defect description attributes, and/or one or more predicted test case description attributes.

In various embodiments of the present disclosure, an example prediction data object may be in various forms. As an example, a prediction data object may be in the form of an API response. Additionally, or alternatively, an example prediction data object may be in other forms or formats.

Referring back to FIG. 4, at step/operation 412, a computing entity (such as the SME computing entity 105 described above in connection with FIG. 1 and FIG. 2) may include means (such as the communications interface 208 of the SME computing entity 105 described above in connection with FIG. 2) for transmitting the prediction data object generated at step/operation 410 to a client device (such as the user computing entities 101A, 101B, . . . 101N described above in connection with FIG. 1 and FIG. 3).

For example, the prediction data object may be in the form of an API response, and the computing entity may transmit the prediction data object to the client device through the API and via one or more networks (such as networks 103 described above in connection with FIG. 1). In some embodiments, the API may be REST-based and developed using a Python framework. In some embodiments, the API may be based on other structure(s) and/or framework(s).

In some embodiments, the client device may be configured to perform one or more software testing operations corresponding to the software testing task based at least in part on the prediction data object. For example, the client device may perform software testing operations based on work track, defect, test case, and/or complexity as predicted by the prediction data object.

Referring back to FIG. 4, the example method 400 ends at step/operation 414.

As illustrated above, examples of the present disclosure may provide various technical advantages in software development and testing.

For example, by implementing machine learning models to provide artificially intelligent subject matter expertise (such as complexity, work track, defect, and/or test case) for a requirement, examples of the present disclosure may decease errors and increase accuracy in software testing. For example, by generating a predicted work track attribute, examples of the present disclosure may reduce and/or eliminate errors in selecting a suitable work track. In some examples, an average precision of work track prediction may be as high as 85%. As another example, by generating a predicted detect description attribute, examples of the present disclosure may identify potential failure points associated with the implementation of a given requirement, making the software testing process more robust as the user will know beforehand some of the defects to look for in the application. As such, quality control and assurance in software development and testing may be improved.

As another example, by programmatically generating prediction data object for a given requirement data object, examples of the present disclosure may increase speed and efficiency in software development and testing, while reducing dependency and workload on human subject matter experts. As described above, the number of available human subject matter experts may be scarce, which often creates a bottleneck in the software development and testing process. Examples of the present disclosure may identify, recommend, and/or predict various subject matters associated with a reequipment with a greater precision and continuous availability to all users without little to no dependency on human subject matter experts.

b. Exemplary Requirement Request Data Object Processing

In various embodiments of the present disclosure, a computing entity (such as the SME computing entity 105 described above in connection with FIG. 1 and FIG. 2) may implement various processing techniques (including, but not limited to, natural language processing techniques) on the requirement request data object prior to providing the requirement request data object as an input to a supervised machine learning model or an unsupervised machine learning model.

Figure 5:
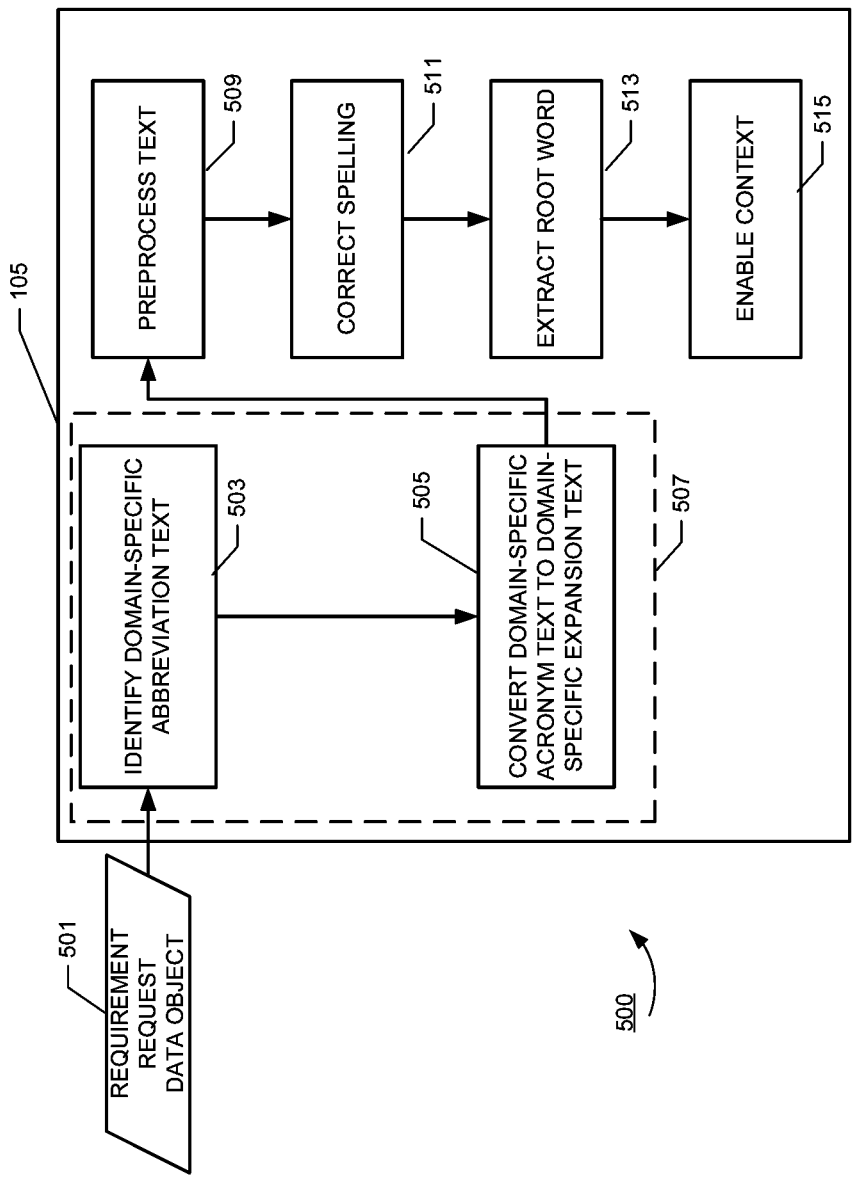

Referring now to FIG. 5, an example method 500 illustrates example initial processing of a requirement request data object in accordance with embodiments of the present disclosure.

For example, a computing entity (such as the SME computing entity 105 described above in connection with FIG. 1 and FIG. 2) may include means (such as the communications interface 208 of the SME computing entity 105 described above in connection with FIG. 2) for receiving a requirement request data object 501, similar to at least step/operation 404 described above in connection with FIG. 4.

Subsequent to receiving the requirement request data object 501, a computing entity (such as the SME computing entity 105 described above in connection with FIG. 1 and FIG. 2) may include means (such as the processing element 205 of the SME computing entity 105 described above in connection with FIG. 2) for processing the requirement request data object using a domain-specific rule engine 507.

In the present disclosure, the term "domain-specific rule engine" refers to a software application, component, framework, product, and/or service that executes one or more rules associated with one or more domains. The term "domain" refers to a subject area or territory associated with a software application, component, framework, product, and/or service. For example, a software application may be created for a healthcare insurance provider, and the domain for the software application may be healthcare insurance. In some embodiments, the domain-specific rule engine may execute such rules in a runtime production environment. In some embodiments, based on the identification of a domain of the software application associated with the requirement request data object 501, the domain-specific rule engine may implement one or more domain-specific rules associated with the identified domain in processing the requirement request data object 501.

For example, at step/operation 503, a computing entity (such as the SME computing entity 105 described above in connection with FIG. 1 and FIG. 2) may include means (such as the processing element 205 of the SME computing entity 105 described above in connection with FIG. 2) for identifying a domain-specific abbreviation text from the requirement request description attribute. In some embodiments, the computing entity may identify the domain-specific abbreviation text based at least in part on a domain-specific rule associated with the requirement request data object. In the present disclosure, the term "domain-specific abbreviation text" refers to an abbreviation of text that may have specific meaning in a given domain.

For example, the requirement request description attribute may comprise a text string that may describe, document, and/or specify a user's request for a functional requirement for a software application in the healthcare domain. As an example, the requirement request description attribute may indicate a requirement that includes an abbreviation text "DJD."

In various embodiments of the present disclosure, the domain-specific rule engine 507 may provide a rule based approach for identifying specific words or abbreviations that may have specific meaning to the domain of the software application. For example, such specific words or abbreviations may be described or defined by one or more domain-specific rules of the domain-specific rule engine 507. Continuing from the example above, based on identifying that the requirement request data object is associated with a software application in the domain of healthcare, the domain-specific rule engine 507 may retrieve one or more domain-specific rules in the healthcare domain. Based on the domain-specific rules, the domain-specific rule engine 507 may identify "DJD" as a domain-specific abbreviation text with the meaning of "Degenerative Joint Disease" in the healthcare domain.

Referring back to FIG. 5, at step/operation 505, a computing entity (such as the SME computing entity 105 described above in connection with FIG. 1 and FIG. 2) may include means (such as the processing element 205 of the SME computing entity 105 described above in connection with FIG. 2) for converting the domain-specific abbreviation text to a domain-specific expansion text. In some embodiments, the computing entity may convert the domain-specific abbreviation text based at least in part on the domain-specific rule.

In the present disclosure, the term "domain-specific expansion text" refers to a text that has been expanded from an abbreviation text based on the specific meaning to a given domain. Continuing from the above example, based on the domain-specific rule in the healthcare domain, the computing entity may convert the domain-specific abbreviation text "DJD" in the requirement request description attribute to the domain-specific expansion text "Degenerative Joint Disease."

While the description above provides an example implementation of a domain-specific rule engine 507, it is noted that the scope of the present disclosure is not limited to the description above. In some examples, an example domain-specific rule engine may provide one or more other types of domain-specific rules. For example, one or more example domain-specific rules may add or remove one or more text(s) to or from a requirement request description attribute based on the domain associated with the requirement request data object, and/or may transfer and/or convert one or more text(s) in the requirement request description attribute based on the domain associated with the requirement request data object, and/or the like.

Referring back to FIG. 5, at step/operation 509, a computing entity (such as the SME computing entity 105 described above in connection with FIG. 1 and FIG. 2) may include means (such as the processing element 205 of the SME computing entity 105 described above in connection with FIG. 2) for conducting preprocessing of the text string associated with the requirement request description attribute.

For example, the computing entity may conduct tokenization of the requirement request description attribute. In such an example, the computing entity may split the text string of the requirement request description attribute into individual pieces or "tokens." For example, the computing entity may break the text string into character tokens and/or sub-word tokens, and may group tokens into semantic unit for processing.

Additionally, or alternatively, the computing entity may conduct normalization of the requirement request description attribute. For example, the computing entity may transform non-standard word in the text string associated with the requirement request description attribute into standard word. As an example, the computing entity may transform the word "tomrw" in the text string associated with the requirement request description attribute to the word "tomorrow."

Additionally, or alternatively, the computing entity may conduct noise removal of the requirement request description attribute. For example, the computing entity may remove, convert, and/or transform character, digits, and the like that may interfere with natural language processing. As an example, the computing entity may remove punctuation marks from the text string associated with the requirement request description attribute.

Additionally, or alternatively, the computing entity may conduct other natural language processing operations and/or procedures of the requirement request description attribute.

Referring back to FIG. 5, at step/operation 511, a computing entity (such as the SME computing entity 105 described above in connection with FIG. 1 and FIG. 2) may include means (such as the processing element 205 of the SME computing entity 105 described above in connection with FIG. 2) for conducting spelling correction(s) on the text string associated with the requirement request description attribute.

For example, based on a system dictionary or a user dictionary, the computing entity may identify one or more spelling errors from the text string associated with the requirement request description attribute, and may correct the spelling errors so that the text string includes corrected spelling. As an example, the computing entity may identify "alot" in the text string as a spelling error, and may correct it to "a lot."

At step/operation 513, a computing entity (such as the SME computing entity 105 described above in connection with FIG. 1 and FIG. 2) may include means (such as the processing element 205 of the SME computing entity 105 described above in connection with FIG. 2) for conducting root word extraction on the text string associated with the requirement request description attribute.

For example, the computing entity may implement one or more stemming techniques and/or algorithms to extract root words from words in the text string associated with the requirement request description attribute. As an example, the computing entity may implement Porter's algorithm to identify a root word associated each word in the text string. Additionally, or alternatively, the computing entity may implement other algorithm(s).

At step/operation 515, a computing entity (such as the SME computing entity 105 described above in connection with FIG. 1 and FIG. 2) may include means (such as the processing element 205 of the SME computing entity 105 described above in connection with FIG. 2) for conducting context enablement and/or analysis on the text string associated with the requirement request description attribute.

For example, the computing entity may break down the text string associated with the requirement request description attribute into n-grams (including, but not limited to, unigrams, bigrams, trigrams) and noun phrases to extract themes and facets within the text string. As an example, the computing entity may identify that a text string associated with the requirement request description attribute describes membership eligibility of healthcare insurance ("theme") based on conducting context enablement and/or analysis.

While the description above provides some example steps/operations on conducting natural language processing on the requirement request description attribute, it is noted that the scope of the present disclosure is not limited to the description above. In some examples, an example method may comprise one or more additional and/or alternative steps/operations. For example, an example method may additionally (or alternatively) includes step(s)/operation(s) of part-of-speech tagging, dependency parsing, and/or the like. In some embodiments, an example method may comprise less than the steps/operations described above.

Referring back to FIG. 5, subsequent to conducting various processing on the requirement request description attribute of the requirement request data object (including, but not limited to, processing through the domain-specific rule engine 507, text preprocessing, spelling correction, root word extraction, and/or context enablement), a computing entity (such as the SME computing entity 105 described above in connection with FIG. 1 and FIG. 2) may include means (such as the processing element 205 of the SME computing entity 105 described above in connection with FIG. 2) for providing the processed requirement request data object to a machine learning model, such as a supervised machine learning model or an unsupervised machine learning model, details of which are described herein (including, but not limited to, those described in connection with at least FIG. 8 to FIG. 15).

c. Exemplary Historical Dataset Generation

Figure 6:
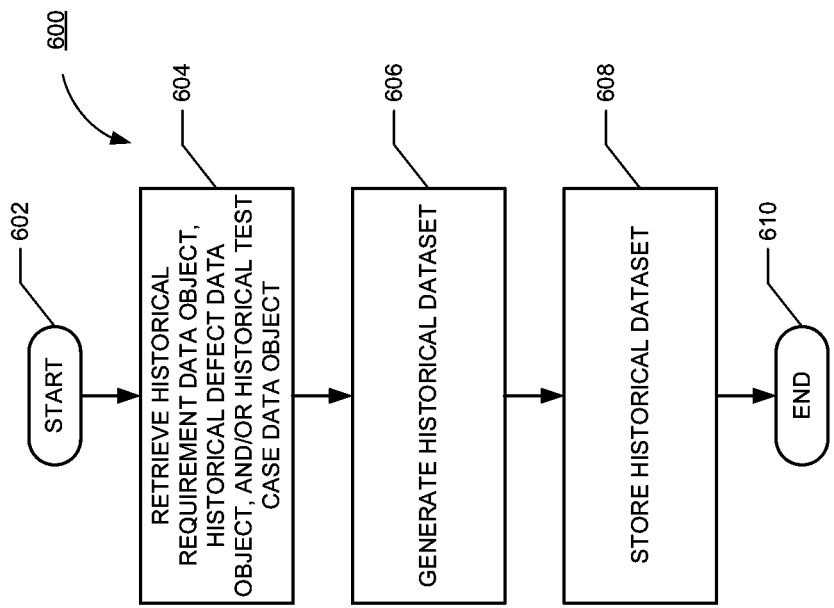
Figure 7:
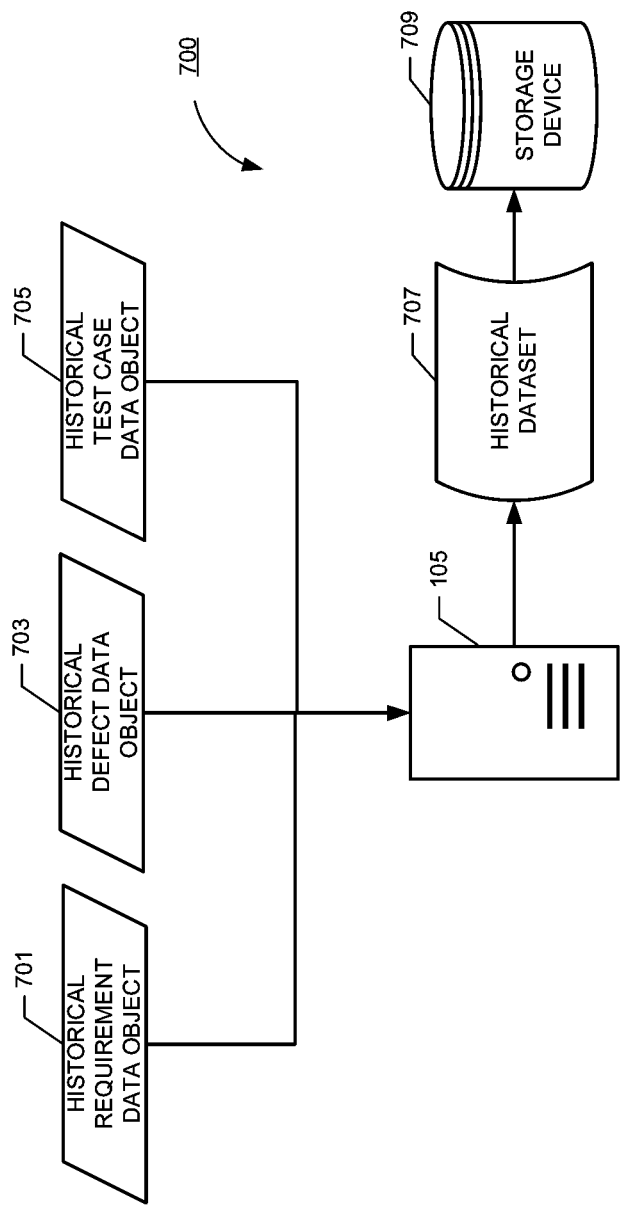

In various embodiments of the present disclosure, a computing entity (such as the SME computing entity 105 described above in connection with FIG. 1 and FIG. 2) may generate example historical dataset(s). As will be described in detail herein, the example historical dataset(s) may guide one or more supervised machine learning models and/or unsupervised machine learning models to generate attributes associated with a prediction data object. Referring now to FIG. 6 and FIG. 7, example methods illustrate example generation of example historical datasets in accordance with embodiments of the present disclosure.

Referring now to FIG. 6, an example method 600 is illustrated. The example method 600 starts at step/operation 602.

At step/operation 604, a computing entity (such as the SME computing entity 105 described above in connection with FIG. 1 and FIG. 2) may include means (such as the processing element 205 of the SME computing entity 105 described above in connection with FIG. 2) for retrieving at least one of a historical requirement data object, a historical defect data object, and/or a historical test case data object. For example, the computing entity may retrieve a historical requirement data object, a historical defect data object, and a historical test case data object.

In the present disclosure, the term "historical requirement data object" refers to a data object that may provide one or more descriptions, documentations and/or specifications indicating a historical requirement associated with one or more software applications, components, frameworks, products, and/or services. For example, a historical requirement data object may be generated based on inputs received from a human subject matter expert and associated with a requirement in the past, and may be stored in a database. In such an example, the historical requirement data object may identify one or more work tracks associated with the requirement. As another example, a historical requirement data object may be programmatically generated (for example, based on processing historical requirements using one or more machine learning models described herein).

In some embodiments, the historical requirement data object may comprise various attributes. For example, the historical requirement data object comprises at least one of a historical requirement identifier attribute, a historical requirement description attribute, and/or a work track attribute.

In the present disclosure, a historical requirement identifier attribute may indicate an identifier associated with the historical requirement. In some embodiments, the historical requirement identifier attribute may comprise a numeric value, an alphabetic value, an alphanumeric value, a text string, an ASCII text, a pointer, a memory address, and/or the like.

In the present disclosure, a historical requirement description attribute may indicate a description associated with the historical requirement. In some embodiments, the historical requirement description attribute may comprise a numeric value, an alphabetic value, an alphanumeric value, a text string, an ASCII text, a pointer, a memory address, and/or the like.

In the present disclosure, a work track attribute may indicate a work track associated with the historical requirement. In some embodiments, the work track attribute may comprise a numeric value, an alphabetic value, an alphanumeric value, a text string, an ASCII text, a pointer, a memory address, and/or the like.

In various embodiments of the present disclosure, an example historical requirement data object may be in various forms and in accordance with various data formats. For example, an example historical requirement data object may be in a tabular format that may include columns and rows and may indicate correlations between/among a historical requirement identifier attribute, a historical requirement description attribute, and a work track attribute. Referring now to TABLE 2 below, example historical requirement data objects are illustrated.

TABLE 2

Example Historical Requirement Data Objects

| Historical Requirement Identifier Attribute | Historical Requirement Description Attribute | Work Track Attribute |
|---|---|---|
| 10894 | The system will follow the response rules requirement document that has been attached for RIDP V2. | RIDP |
| 10860 | The system shall exclude a member from pending MH benefit when the member is less than 21 years of age. | MassHealth |
| 10443 | The system shall follow the rules defined in "handling Multiple Discrepancy" when there are multiple discrepancy identified during the PDM process. | Periodic Data Matching |

For example, the historical requirement data object that has a historical requirement identifier attribute of "10894" may have a corresponding historical requirement description attribute of "The system will follow the response rules requirement document that has been attached for RIDP V2." and a corresponding work track attribute of "RIDP."

While the description above provides some example attributes of a historical requirement data object, it is noted that the scope of the present disclosure is not limited to the description above. In some examples, an example historical requirement data object may comprise one or more additional and/or alternative attributes, or less attributes than those described above.

Similarly, while the description above provides an example historical requirement data object in a tabular format, it is noted that the scope of the present disclosure is not limited to the description above. In some examples, an example historical requirement data object may be in other forms and/or other formats.

In the present disclosure, the term "historical defect data object" refers to a data object that may provide one or more descriptions, documentations and/or specifications indicating a historical defect associated with one or more software applications, components, frameworks, products, and/or services. For example, a historical defect data object may be generated based on inputs received from a human subject matter expert and associated with a requirement in the past, and may be stored in a database. In such an example, the historical defect data object may identify one or more work tracks associated with the defect. As another example, a historical defect data object may be programmatically generated (for example, based on processing historical defects using one or more machine learning models described herein).

In some embodiments, the historical defect data object may comprise various attributes. For example, the historical defect data object comprises at least one of a historical defect identifier attribute, a historical defect description attribute, and/or a work track attribute.

In the present disclosure, a historical defect identifier attribute may indicate an identifier associated with the historical defect. In some embodiments, the historical defect identifier attribute may comprise a numeric value, an alphabetic value, an alphanumeric value, a text string, an ASCII text, a pointer, a memory address, and/or the like.

In the present disclosure, a historical defect description attribute may indicate a description associated with the historical defect. In some embodiments, the historical defect description attribute may comprise a numeric value, an alphabetic value, an alphanumeric value, a text string, an ASCII text, a pointer, a memory address, and/or the like.

In the present disclosure, a work track attribute may indicate a work track associated with the historical defect. In some embodiments, the work track attribute may comprise a numeric value, an alphabetic value, an alphanumeric value, a text string, an ASCII text, a pointer, a memory address, and/or the like.

In various embodiments of the present disclosure, an example historical defect data object may be in various forms and in accordance with various data formats. For example, an example historical defect data object may be in a tabular format that may include columns and rows and may indicate correlations between/among a historical defect identifier attribute, a historical defect description attribute, and a work track attribute. Referring now to TABLE 3 below, example historical defect data objects are illustrated.

TABLE 3

Example Historical Defect Data Objects

| Historical Defect Identifier Attribute | Historical Defect Description Attribute | Work Track Attribute |
|---|---|---|
| 15724 | The eligibility effective date is calculated incorrectly when the member is marked pregnant in RAC for initial pend. | PD - Medicaid |
| 15849 | Aid Cat given to QAB and ILP members after Immigration RFI Expiry is "1Y-(Health Safety Net Partial)' instead of "AP-(Health Safety Net Partial)" | Eligibility Verification |

TABLE 3-continued

Example Historical Defect Data Objects

| Historical Defect Identifier Attribute | Historical Defect Description Attribute | Work Track Attribute |
|---|---|---|
| 15918 | Home and mailing addresses are not listed correctly in the Application Summary section. | Address Standardization |

For example, the historical defect data object that has a historical defect identifier attribute of "15724" may have a corresponding historical defect description attribute of "The eligibility effective date is calculated incorrectly when the member is marked pregnant in RAC for initial pend." and a corresponding work track attribute of "PD—Medicaid."

While the description above provides some example attributes of a historical defect data object, it is noted that the scope of the present disclosure is not limited to the description above. In some examples, an example historical defect data object may comprise one or more additional and/or alternative attributes, or less attributes than those described above.

Similarly, while the description above provides an example historical defect data object in a tabular format, it is noted that the scope of the present disclosure is not limited to the description above. In some examples, an example historical defect data object may be in other forms and/or other formats.

In the present disclosure, the term "historical test case data object" refers to a data object that may provide one or more descriptions, documentations and/or specifications indicating a historical test case associated with one or more software applications, components, frameworks, products, and/or services. For example, a historical test case data object may be generated based on inputs received from a human subject matter expert and associated with a requirement in the past, and may be stored in a database. In such an example, the historical test case data object may identify one or more work tracks associated with the test case. As another example, a historical test case data object may be programmatically generated (for example, based on processing historical test cases using one or more machine learning models described herein).

In some embodiments, the historical test case data object may comprise various attributes. For example, the historical test case data object comprises at least one of a historical test case identifier attribute, a historical test case description attribute, and/or a work track attribute.

In the present disclosure, a historical test case identifier attribute may indicate an identifier associated with the historical test case. In some embodiments, the historical test case identifier attribute may comprise a numeric value, an alphabetic value, an alphanumeric value, a text string, an ASCII text, a pointer, a memory address, and/or the like.

In the present disclosure, a historical test case description attribute may indicate a description associated with the historical test case. In some embodiments, the historical test case description attribute may comprise a numeric value, an alphabetic value, an alphanumeric value, a text string, an ASCII text, a pointer, a memory address, and/or the like.

In the present disclosure, a work track attribute may indicate a work track associated with the historical test case. In some embodiments, the work track attribute may comprise a numeric value, an alphabetic value, an alphanumeric value, a text string, an ASCII text, a pointer, a memory address, and/or the like.

In various embodiments of the present disclosure, an example historical test case data object may be in various forms and in accordance with various data formats. For example, an example historical test case data object may be in a tabular format that may include columns and rows and may indicate correlations between/among a historical test case identifier attribute, a historical test case description attribute, and a work track attribute. Referring now to TABLE 4 below, example historical test case data objects are illustrated.

TABLE 4

Example Historical Test Case Data Objects

| Historical Test Case Identifier Attribute | Historical Test Case Description Attribute | Work Track Attribute |
|---|---|---|
| 45613 | This test case validates that system should not generate VR notices when there is an eligibility redetermined during PDM Process. | Eligibility Verification |
| 44881 | This test case validates that system should not give JAXB error in MMIS transaction on Time Clock expiry for DOR discrepancy (DOR INCOME INCOMPATIBLE) | Periodic Data Matching |
| 41676 | This testcase validates that records are processed for auto enrollment without any marshelling error | Open Enrollment |

For example, the historical test case data object that has a historical test case identifier attribute of "45613" may have a corresponding historical test case description attribute of "This test case validates that system should not generate VR notices when there is an eligibility redetermined during PDM Process." and a corresponding work track attribute of "Eligibility Verification."

While the description above provides some example attributes of a historical test case data object, it is noted that the scope of the present disclosure is not limited to the description above. In some examples, an example historical test case data object may comprise one or more additional and/or alternative attributes, or less attributes than those described above.

Similarly, while the description above provides an example historical test case data object in a tabular format, it is noted that the scope of the present disclosure is not limited to the description above. In some examples, an example historical test case data object may be in other forms and/or other formats.

Referring now to FIG. 7, an example diagram 700 illustrates an example of generating historical dataset in accordance with various embodiments of the present disclosure. In the example shown in FIG. 7, the SME computing entity 105 may retrieve a historical requirement data object 701, a historical defect data object 703, and/or a historical test case data object 705.

In some embodiments, the historical requirement data object 701, the historical defect data object 703, and/or the historical test case data object 705 may be stored in a storage device that is an integral part of the SME computing entity 105 (for example, the storage media 207 of the SME computing entity 105 illustrated in FIG. 2 above). In some embodiments, the storage device 709 is external to the SME computing entity 105. For example, the historical requirement data object 701, the historical defect data object 703, and/or the historical test case data object 705 may be stored in a storage device (such as a data repository or a database) that is external to the SME computing entity 105 and/or the software testing platform/system as illustrated in FIG. 1.

In some embodiments, the SME computing entity 105 may retrieve the historical requirement data object 701, the historical defect data object 703, and/or the historical test case data object 705 based at least in part on step/operation 604 described above in connection with FIG. 6.

Referring back to FIG. 6, at step/operation 606, a computing entity (such as the SME computing entity 105 described above in connection with FIG. 1 and FIG. 2) may include means (such as the processing element 205 of the SME computing entity 105 described above in connection with FIG. 2) for generating a historical dataset based at least in part on at least one of the historical requirement data object, the historical defect data object, and/or the historical test case data object. For example, the computing entity may generate the historical dataset based on the historical requirement data object, the historical defect data object, and the historical test case data object.

In some embodiments, the computing entity may merge at least two of a historical requirement description attribute of the historical requirement data object, a historical defect description attribute of the historical defect data object, and/or a historical test case description attribute of the historical test case data object. For example, the computing entity may merge a historical requirement description attribute of the historical requirement data object, a historical defect description attribute of the historical defect data object, and a historical test case description attribute of the historical test case data object based on their corresponding work track attributes are the same.

For example, as shown in the examples above, an example historical requirement data object may indicate a correlation between a historical requirement description attribute and a work track attribute. An example historical defect data object may indicate a correlation between a historical defect description attribute and a work track attribute. an example historical test case data object may indicate a correlation between a historical test case description attribute and a work track attribute. As such, the computing entity may identify a historical requirement description attribute, a historical defect description attribute, and/or a historical test case description attribute that correlate to the same work track attribute, and merge the identified historical requirement description attribute, the identified historical defect description attribute, and/or the identified historical test case description attribute to create the historical dataset.

As an example, the computing entity may identify a historical requirement description attribute that correlates to the work track attribute "eligibility verification" in a historical requirement data object. The computing entity may also identify a historical defect description attribute that correlates to the work track attribute "eligibility verification" in a historical defect data object. The computing entity may further identify a historical test case description attribute that correlates to the work track attribute "eligibility verification" in a historical test case data object. The computing entity may merge the historical requirement description attribute, the historical defect description attribute, and the historical test case description attribute that all correlates to the work track attribute "eligibility verification" in the historical dataset.

As shown in the example above, the historical dataset may comprise a plurality of work track attributes. Each of the plurality of work track attributes may correlate to a description attribute that may be generated based on merging a historical requirement description attribute, a historical defect description attribute, and/or a historical test case description attribute. In some embodiments, the computing entity may implement various processing techniques (including, but not limited to, natural language processing techniques) on the description attribute of the historical dataset, similar to those described above in connection with at least FIG. 4.

In addition to or in alternative of merging the historical requirement description attribute, the historical defect description attribute, and/or the historical test case description attribute, the computing entity may indicate attribute correlations between the historical requirement description attribute, the historical defect description attribute, and/or the historical test case description attribute, details of which are described herein.

While the description above provides some example attributes of an example historical dataset, it is noted that the scope of the present disclosure is not limited to the description above. In some examples, an example historical dataset may comprise one or more additional and/or alternative attributes. In some examples, an example historical dataset may comprise less than the attributes described above.

In various embodiments of the present disclosure, an example historical dataset may be in various forms and in accordance with various data formats. For example, an example historical dataset may be in a tabular format that includes columns and rows. Additionally, or alternatively, an example historical dataset may be in a node graph format that includes a plurality of nodes. Additionally, or alternatively, an example historical dataset may be in other formats and/or forms.

As described above, the historical dataset may indicate a plurality of attribute correlations between various attributes. In the present disclosure, the term "attribute correlation" refers to an association between two or more attributes of a dataset. As one example, the dataset may be in a tabular format, and an attribute correlation of two attributes may be manifested in storing the two attributes on the same row or same column in the tabular format. As another example, the dataset may be in a node graph format, and an attribute correlation of two attributes may be manifested in connecting nodes representing the two attributes in the node graph.

For example, the historical dataset may indicate a plurality of attribute correlations between a plurality of historical requirement description attributes and a plurality of historical defect description attributes. As an example, the computing entity may determine that a historical requirement description attribute and a historical defect description attribute both correlate to the same work track attribute, and may establish an attribute correlation between the historical requirement description attribute and the historical defect description attribute. Additionally, or alternatively, the computing entity may implement other techniques (such as, but not limited to, supervised machine learning model(s) and/or unsupervised machine learning model(s)) to identify relationships between historical requirement description attributes and historical defect description attributes, and may establish attribute correlations based on the identified relationships.

Additionally, or alternatively, the historical dataset may indicate a plurality of attribute correlations between a plurality of historical requirement description attributes and a plurality of historical test case description attributes. As an example, the computing entity may determine that a historical requirement description attribute and a historical test case description attribute both correlate to the same work track attribute, and may establish an attribute correlation between the historical requirement description attribute and the historical test case description attribute. Additionally, or alternatively, the computing entity may implement other techniques (such as, but not limited to, supervised machine learning model(s) and/or unsupervised machine learning model(s)) to identify relationships between historical requirement description attributes and historical test case description attributes, and may establish attribute correlations based on the identified relationships.

Additionally, or alternatively, the historical dataset may indicate a plurality of attribute correlations between a plurality of historical defect description attributes and a plurality of historical test case description attributes, similar to those described above.

Referring now to FIG. 7, the SME computing entity 105 may generate a historical dataset 707 based on, for example, at least step/operation 606 described above in connection with FIG. 6.

Referring back to FIG. 6, at step/operation 608, a computing entity (such as the SME computing entity 105 described above in connection with FIG. 1 and FIG. 2) may include means (such as the processing element 205 of the SME computing entity 105 described above in connection with FIG. 2) for storing the historical dataset in a storage device.

Referring now to FIG. 7, the SME computing entity 105 may store the historical dataset 707 to a storage device 709. In some embodiments, the storage device 709 is an integral part of the SME computing entity 105 (for example, the storage media 207 of the SME computing entity 105 illustrated in FIG. 2 above). In some embodiments, the storage device 709 is external to the SME computing entity 105. For example, the historical dataset 707 may be stored in the storage device 709 (such as a data repository or a database) that is external to the SME computing entity 105 and/or the software testing platform/system as illustrated in FIG. 1.

In some embodiments, the historical dataset may be utilized by one or more machine learning models (such as one or more supervised machine learning models and/or one or more unsupervised machine learning models) to generate one or more attributes associated with a prediction data object, details of which are described herein (including, but not limited to, those described in connection with at least FIG. 8 to FIG. 15).

Referring back to FIG. 6, the example method ends at step/operation 610.

d. Exemplary Predicted Complexity Attribute Generation and Predicted Work Track Attribute Generation As described above, a computing entity (such as the SME computing entity 105 described above in connection with FIG. 1 and FIG. 2) may generate at least one of a predicted complexity attribute or a predicted work track attribute corresponding to the requirement request data object based at least in part on the requirement request description attribute of the requirement request data object and a supervised machine learning model.

Figure 8:
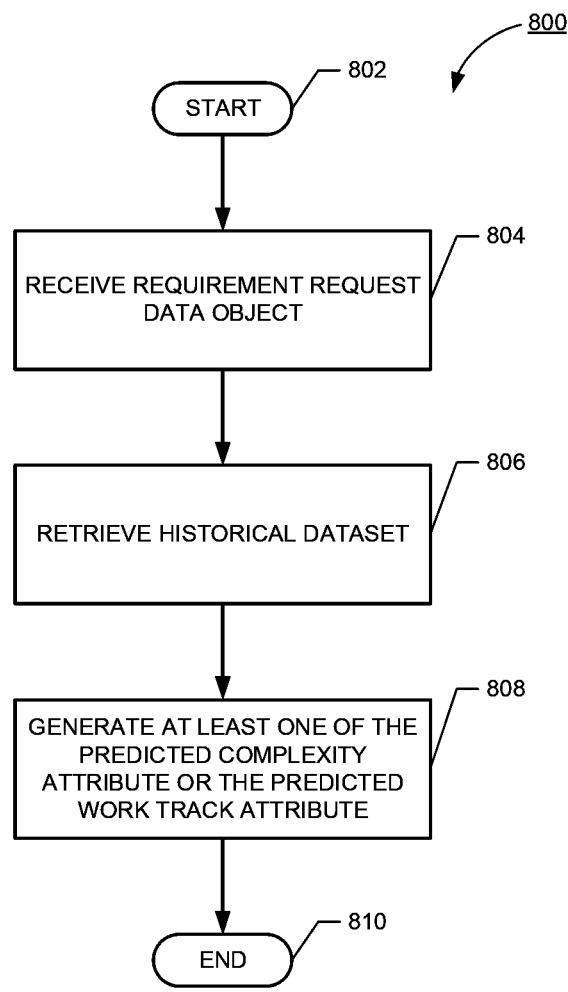

Referring now to FIG. 8, an example method 800 illustrates example operations of generating at least one of a predicted complexity attribute or a predicted work track attribute in accordance with embodiments of the present disclosure. For example, a computing entity may generate both a predicted complexity attribute and a predicted work track attribute based on the example method 800.

The example method 800 starts at step/operation 802.

At step/operation 804, a computing entity (such as the SME computing entity 105 described above in connection with FIG. 1 and FIG. 2) may include means (such as the communications interface 208 of the SME computing entity 105 described above in connection with FIG. 2) for receiving a requirement request data object, similar to at least step/operation 404 described above in connection with FIG. 4.

In some embodiments, the computing entity may implement various processing techniques (including, but not limited to, natural language processing techniques) on the requirement request data object, similar to those described above in connection with at least FIG. 5.

Referring back to FIG. 8, at step/operation 806, a computing entity (such as the SME computing entity 105 described above in connection with FIG. 1 and FIG. 2) may include means (such as the processing element 205 of the SME computing entity 105 described above in connection with FIG. 2) for retrieving a historical dataset from a storage device.

In some embodiments, the historical dataset may be generated by the computing entity and/or stored by the computing entity in the storage device, similar to those described above in connection with at least FIG. 6 and FIG. 7.

In some embodiments, the historical dataset may be retrieved based on a domain associated with the requirement request data object. As described above, the term "domain" refers to a subject area or territory associated with a software application, component, framework, product, and/or service. Example domains may include, but not limited to, healthcare, education, transportation, and/or the like. In some embodiments, each historical dataset may be related to a particular domain. For example, a historical dataset may be related to the healthcare domain, and include historical information related to testing of a software application, component, framework, product, and/or service in the healthcare domain (e.g. information obtained from historical requirement data object(s), historical defect data object(s), and/or historical test case data object(s)). As described above, the requirement request data object may be related to requirement(s) of a software application, component, framework, product, and/or service in particular domain. Continuing form the example above, the requirement request data object may indicate a requirement for a software application in the healthcare domain. Accordingly, the computing entity may retrieve a historical dataset that is in the healthcare domain.

Additionally, or alternatively, the computing entity may retrieve a historical dataset based on other methods and/or criteria.

At step/operation 808, a computing entity (such as the SME computing entity 105 described above in connection with FIG. 1 and FIG. 2) may include means (such as the processing element 205 of the SME computing entity 105 described above in connection with FIG. 2) for generating at least one of the predicted complexity attribute or the predicted work track attribute.

In some embodiments, the computing entity may generate at least one of the predicted complexity attribute or the predicted work track attribute based on the requirement request description attribute of the requirement request data object received at step/operation 804, the historical dataset retrieved at step/operation 806 and a supervised machine learning model.

In the present disclosure, the term "supervised machine learning model" refers to a machine learning model that may generate an output in response to an input based on example input-output pairs. For example, a supervised machine learning model may be "trained" using the example input-output pairs to produce one or more inferred functions, which may in turn be used to map a received input to an output. Examples of supervised machine learning models may include, but not limited to, classification models (such as, but not limited to, K-Nearest Neighbors), regression models (such as, but not limited to, Logistic Regression), hybrid classification-regression models (such as, but not limited to, Support Vector Machine), and/or the like.

In some embodiments, a supervised machine learning model may be an ensemble of machine learning models. An ensemble of machine learning models (or an "ensemble machine learning model") may comprise multiple machine learning models that are combined together to generate an output in response to an input. Examples of ensemble machine learning models may include, but not limited to, Random Forest, Naïve Bayes, Logistic Regression, Gradient Boosting and/or the like. Implementing an ensemble machine learning model may provide various technical advantages over implementing a single machine learning model, such as better predictive performance and/or increased precision. For example, an ensemble machine learning model may provide optimal weights for vector representation of an input so as to reduce multinomial cross-entropy loss.

In various embodiments of the present disclosure, an example supervised machine learning model may provide an accuracy of 84% with an average precision of 0.84 and an average recall 0.84. In other embodiments of the present disclosure, various metrics (including accuracy, precision, and/or recall) of an example supervised machine learning model may be of other values.

Referring back to FIG. 8, the supervised machine learning model may be trained based on the historical dataset retrieved at step/operation 806. Using the requirement request description attribute of the requirement request data object as an input, the supervised machine learning model may generate at least one of the predicted complexity attribute and/or the predicted work track attribute as output(s). For example, the supervised machine learning model may generate a predicted complexity attribute and one or more predicted work track attributes, additional details of which are described in connection with at least FIG. 9 and FIG. 10.

Referring back to FIG. 8, the example method 800 ends at step/operation 810.

Figure 9:
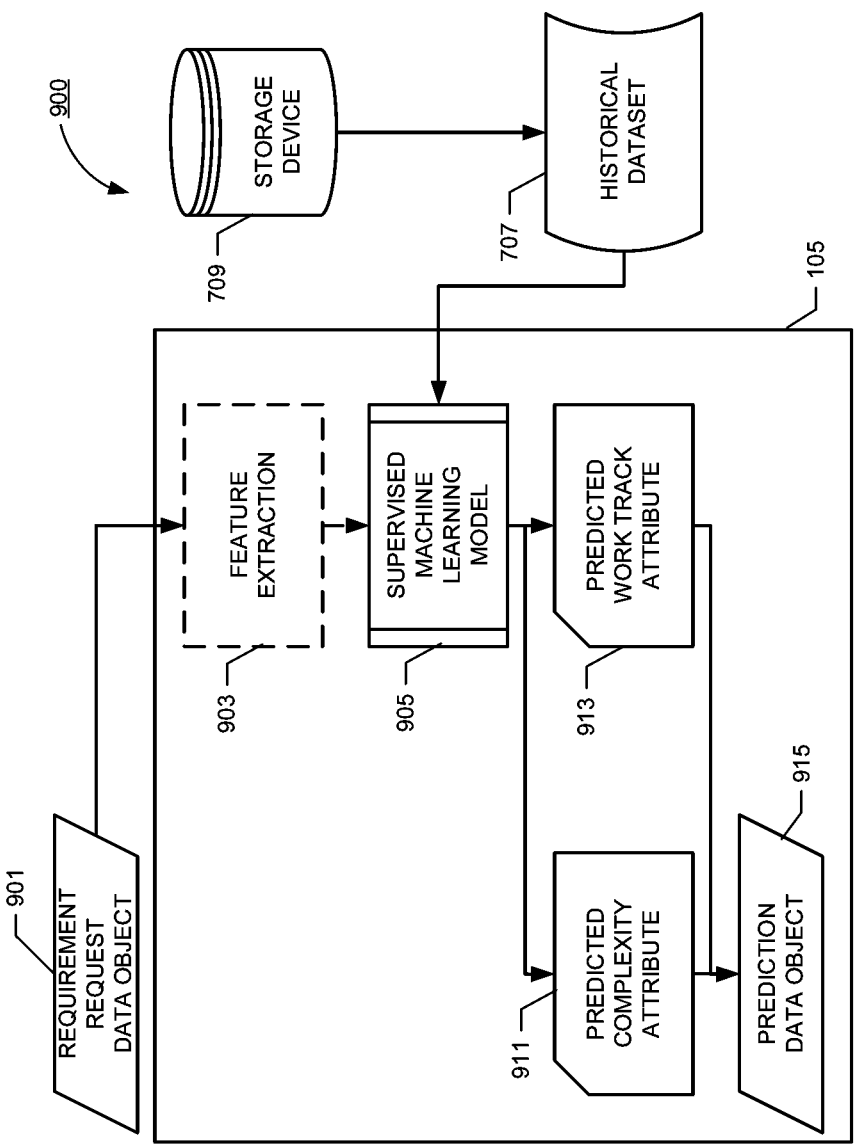

Referring now to FIG. 9, an example diagram 900 illustrates an example of generating predicted complexity attributes and predicted work track attributes in accordance with various embodiments of the present disclosure.

In the examples shown in FIG. 9, the SME computing entity 105 may receive a requirement request data object 901, similar to at least step/operation 404 described above in connection with FIG. 4.

In some embodiments, the SME computing entity 105 may implement various processing techniques (including, but not limited to, natural language processing techniques) on the requirement request data object, similar to those described above in connection with at least FIG. 5.

In some embodiments, the SME computing entity 105 may optionally implement techniques of feature extraction 903 on the requirement request data object 901 (for example, on the requirement request description attribute). The term "feature extraction" refers to a process, operation, algorithm, and/or the like for transforming an initial set of data based on identifying key features of the data so that it may be suitable for further processing by a machine learning model (for example, by converting such data into feature vectors). Examples of feature extraction techniques may include, but not limited to, Bag of Words, Word Embedding, and/or the like.

In some embodiments, subsequent to implementing techniques of feature extraction 903, the SME computing entity 105 may provide the requirement request description attribute of the requirement request data object (that has been transformed through feature extraction 903) to a supervised machine learning model 905.

Similar to those described above in connection with FIG. 8, the supervised machine learning model 905 may include an ensemble machine learning model, which may be trained using the historical dataset 707 as a training set. In some embodiments, the historical dataset 707 may be generated by the SME computing entity 105 and/or stored by the SME computing entity 105 in the storage device 709, similar to those described above in connection with at least FIG. 6 and FIG. 7.

As described above in connection with at least FIG. 6 and FIG. 7, the historical dataset 707 may comprise a plurality of work track attributes. Each of the plurality of work track attributes may correlate to a description attribute that may be generated based on merging a historical requirement description attribute, a historical defect description attribute, and/or a historical test case description attribute. Accordingly, the historical dataset 707 may be provided to the supervised machine learning model 905 as a training set for predicting a work track attribute based on a description attribute, and the supervised machine learning model 905 may infer one or more functions that may be used to map a description attribute to a work track attribute.

In the example shown in FIG. 9, the supervised machine learning model 905 may generate a predicted work track attribute 913 based on the received requirement request description attribute as an input and one or more inferred functions from the historical dataset 707 described above.

While the description above provides an example of generating a work track attribute, it is noted that the scope of the present disclosure is not limited to the description above. In some embodiments, an example supervised machine learning model may generate more than one work track attribute for one requirement request data object. In some embodiments, the SME computing entity 105 may calculate confidence scores associated with the work track attributes, details of which are described in connection with at least FIG. 10.

Referring back to FIG. 9, additionally, or alternatively, the historical dataset 707 may include a plurality of description attributes. Each of the description attributes may be associated with a historical requirement, and may correlate to a complexity attribute that indicates a complexity level associated with the historical requirement (for example, as previously determined by a human subject matter expert and/or a machine learning model). Accordingly, the historical dataset 707 may be provided to the supervised machine learning model 905 as a training set for predicting a complexity attribute based on a description attribute, and the supervised machine learning model 905 may infer one or more functions that may be used to map a description attribute to a complexity attribute. In the example shown in FIG. 9, the supervised machine learning model 905 may generate a predicted complexity attribute 911 based on the received requirement request description attribute as an input and one or more inferred functions from the historical dataset 707 described above.

Additionally, or alternatively, the predicted complexity attribute 911 may be generated based on other methods. For example, the historical dataset 707 may include a plurality of work track attributes. Each of the work track attributes may correlate to a complexity attribute that indicates a complexity level associated with a work track attribute (for example, as previously determined by a human subject matter expert and/or a machine learning model). In such an example, based on the predicted work track attribute 913, the SME computing entity 105 may identify the corresponding complexity attribute from the historical dataset 707, and may provide the corresponding complexity attribute as the predicted complexity attribute 911.

Referring back to FIG. 9, in some embodiments, the SME computing entity 105 may generate a prediction data object 915 that may comprise the predicted complexity attribute 911 and/or the predicted work track attribute 913. Subsequently, the SME computing entity 105 may transmit the prediction data object 915 to a client device, similar to those described above in connection with at least step/operation 412 of FIG. 4.

Figure 10:
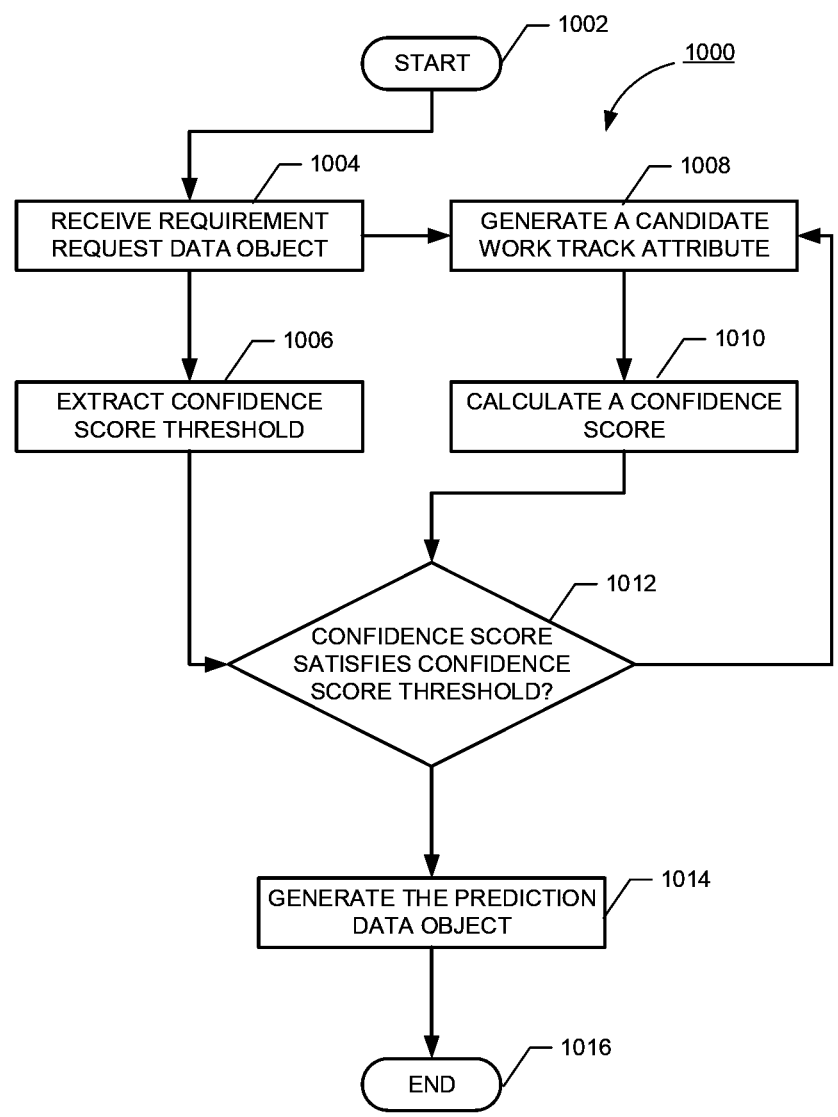

Referring now to FIG. 10, an example method 1000 illustrates example generation of example prediction data object in accordance with embodiments of the present disclosure.

The example method 1000 starts at step/operation 1002.

At step/operation 1004, a computing entity (such as the SME computing entity 105 described above in connection with FIG. 1 and FIG. 2) may include means (such as the communications interface 208 of the SME computing entity 105 described above in connection with FIG. 2) for receiving a requirement request data object, similar to at least step/operation 404 described above in connection with FIG. 4.

In some embodiments, the computing entity may implement various processing techniques (including, but not limited to, natural language processing techniques) on the requirement request data object, similar to those described above in connection with at least FIG. 5.

At step/operation 1006, a computing entity (such as the SME computing entity 105 described above in connection with FIG. 1 and FIG. 2) may include means (such as the processing element 205 of the SME computing entity 105 described above in connection with FIG. 2) for extracting a confidence score threshold from the requirement request data object received at step/operation 1004.

As described above, the confidence score threshold may indicate a minimum confidence score requirement for the predicted work track attribute generated by the supervised machine learning model.

As an example, the requirement request data object may be in the form of an API request block that comprises a "diff" value that indicates a confidence score threshold attribute, and the computing entity may exact the "diff" value as the corresponding confidence score threshold.

At step/operation 1008, a computing entity (such as the SME computing entity 105 described above in connection with FIG. 1 and FIG. 2) may include means (such as the processing element 205 of the SME computing entity 105 described above in connection with FIG. 2) for generating a candidate work track attribute.

In some embodiments, the computing entity may generate the candidate work track attribute based on the requirement request description attribute of the requirement request data object received at step/operation 1004, a historical dataset and a supervised machine learning model, similar to generating a predicted work track attribute described above in connection with at least FIG. 8 and FIG. 9.

At step/operation 1010, a computing entity (such as the SME computing entity 105 described above in connection with FIG. 1 and FIG. 2) may include means (such as the processing element 205 of the SME computing entity 105 described above in connection with FIG. 2) for calculating a confidence score associated with the candidate work track attribute generated at step/operation 1008. In some embodiments, the computing entity may use the supervised machine learning model to calculate the confidence score.

In the present disclosure, the term "confidence score" refers to a probability that an output generated by a machine learning model is accurate and/or correct. In various embodiments, the confidence score may be calculated through various methods. As an example, the supervised machine learning model may be executed multiple times to generate a set of outputs (for example, multiple work track attributes) based on the same input, and may calculate the confidence score for a given output based on the percentage that the given output occurs in the set of outputs. In some embodiments, the confidence score may be calculated based on other methods.

At step/operation 1012, a computing entity (such as the SME computing entity 105 described above in connection with FIG. 1 and FIG. 2) may include means (such as the processing element 205 of the SME computing entity 105 described above in connection with FIG. 2) for determining whether the confidence score calculated at step/operation 1010 satisfies the confidence score threshold extracted from the requirement request data object at step/operation 1006.

If, at step/operation 1012, the computing entity determines that the confidence score does not satisfy the confidence score threshold, the example method 1000 may return to step/operation 1008 and the computing entity may generate another candidate work track attribute.

For example, the computing entity may determine that the confidence score does not satisfy the confidence score threshold when both the confidence score and the confidence score threshold are positive values, and the confidence score is less than the confidence score threshold. As another example, the computing entity may determine that the confidence score does not satisfy the confidence score threshold when both the confidence score and the confidence score threshold are negative values, and the confidence score is more than the confidence score threshold. As another example, the computing entity may determine that the confidence score does not satisfy the confidence score threshold when the confidence score is a negative value and the confidence score threshold is a positive value.

If, at step/operation 1012, the computing entity determines that the confidence score satisfies the confidence score threshold, the example method 1000 may proceed to step/operation 1014. At step/operation 1014, a computing entity (such as the SME computing entity 105 described above in connection with FIG. 1 and FIG. 2) may include means (such as the processing element 205 of the SME computing entity 105 described above in connection with FIG. 2) for generating the prediction data object.

For example, the computing entity may determine that the confidence score satisfies the confidence score threshold when both the confidence score and the confidence score threshold are positive values, and the confidence score is more than the confidence score threshold. As another example, the computing entity may determine that the confidence score satisfies the confidence score threshold when both the confidence score and the confidence score threshold are negative values, and the confidence score is less than the confidence score threshold. As another example, the computing entity may determine that the confidence score satisfies the confidence score threshold when the confidence score is a positive value and the confidence score threshold is a negative value.

In some embodiments, the prediction data object generated by the computing entity at step/operation 1014 may include the candidate work track attribute as a predicted work track attribute. Subsequently, the computing entity may transmit the prediction data object to a client device, similar to those described above in connection with at least step/operation 412 of FIG. 4.

Referring back to FIG. 10, the example method 1000 ends at step/operation 1016.

e. Exemplary Predicted Defect Description Attribute Generation and Predicted Test Case Description Attribute Generation As described above, a computing entity (such as the SME computing entity 105 described above in connection with FIG. 1 and FIG. 2) may generate at least one of a predicted defect description attribute or a predicted test case description attribute corresponding to the requirement request data object based at least in part on the requirement request description attribute of the requirement request data object and an unsupervised machine learning model.

Figure 11:
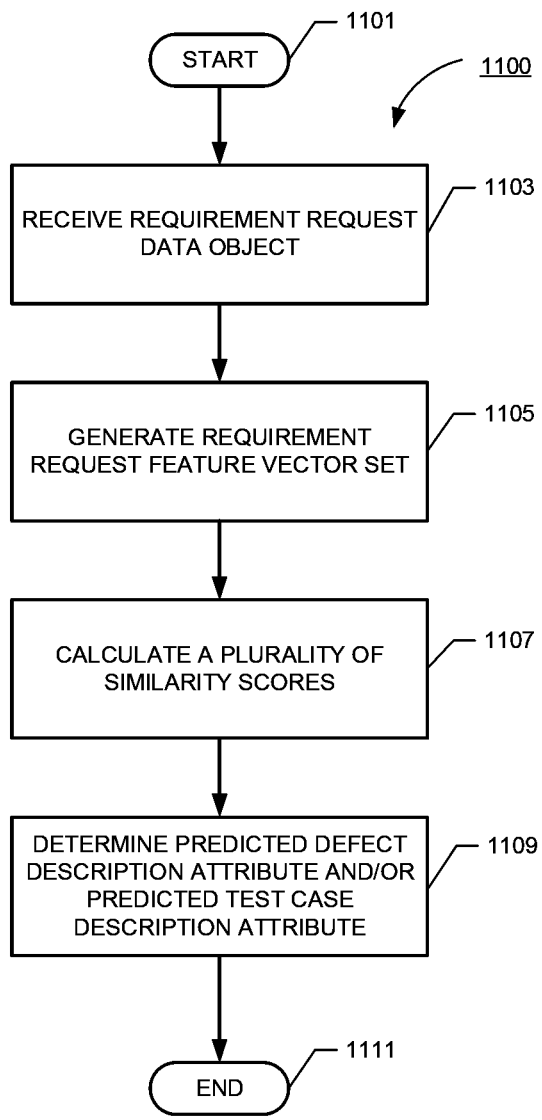

Referring now to FIG. 11, an example method 1100 illustrates example operations of generating at least one of a predicted defect description attribute or a predicted test case description attribute in accordance with embodiments of the present disclosure. For example, a computing entity may generate one or more predicted defect description attributes and one or more predicted test case description attributes based on the example method 1100.

The example method 1100 starts at step/operation 1101.

At step/operation 1103, a computing entity (such as the SME computing entity 105 described above in connection with FIG. 1 and FIG. 2) may include means (such as the communications interface 208 of the SME computing entity 105 described above in connection with FIG. 2) for receiving a requirement request data object, similar to at least step/operation 404 described above in connection with FIG. 4.

In some embodiments, the computing entity may implement various processing techniques (including, but not limited to, natural language processing techniques) on the requirement request data object, similar to those described above in connection with at least FIG. 5.

At step/operation 1105, a computing entity (such as the SME computing entity 105 described above in connection with FIG. 1 and FIG. 2) may include means (such as the processing element 205 of the SME computing entity 105 described above in connection with FIG. 2) for generating a requirement request feature vector set.

In some embodiments, the requirement request feature vector set may be generated by the computing entity based on the requirement request description attribute of the requirement request data object received at step/operation 1103.

In some embodiments, the requirement request feature vector set may comprise multiple elements that may numerically represent the requirement request data object, in the form of an ordered set of coordinates with respect to a numeric vector space. In various embodiments, the computing entity may generate the requirement request feature vector set based on various methods.

For example, the computing entity may generate the requirement request feature vector set based on a Team Frequency-Inverse Document Frequency (TF-IDF) model. The Term Frequency (TF) corresponds to how frequently a term appears in the entire document (for example, the requirement request description attribute). The Inverse Document Frequency (IDF) corresponds to whether a term is rare or frequent across the documents from the entire corpus (for example, multiple requirement request description attributes). In some embodiments, the computing entity may set maximum and/or minimum frequencies (for example, but not limited to, a minimum document frequency of 0.50 and/or a maximum document frequency of 0.85) so as to, for example, minimize feature space and sparsity.

While the description above provides an example of a requirement request feature vector set, it is noted that the scope of the present disclosure is not limited to the description above. In some examples, an example requirement request feature vector set may be in other form(s) and generated by other method(s).

At step/operation 1107, a computing entity (such as the SME computing entity 105 described above in connection with FIG. 1 and FIG. 2) may include means (such as the processing element 205 of the SME computing entity 105 described above in connection with FIG. 2) for calculating a plurality of similarity scores.

In some embodiments, the plurality of similarity scores may be calculated based on an unsupervised machine learning model. In the present disclosure, the term "unsupervised machine learning model" refers to a machine learning model that may search for patterns in a data set, where the patterns are previously undetected and with no pre-existing labels. In some embodiments, an unsupervised machine learning model may require little to no human supervision. Examples of unsupervised machine learning models may include, but not limited to, clustering models (such as, but not limited to, K-Means), association models (such as, but not limited to, Apriori algorithm), and/or the like.

In the present disclosure, the term "similarity score" refers to a measure or metric of a similarity level between two attributes (i.e. how similar two attributes are). In some embodiments, the similar score may indicate the similar level irrespective of the size of attributes. For example, the unsupervised machine learning model may generate a plurality of similarity scores based on a cosine similarity. Mathematically, the cosine similarity measures the cosine of an angle between two vectors projected in a multi-dimensional space.

For example, the unsupervised machine learning model may calculate a plurality of similarity scores (e.g. cosine similarities) based on the requirement request feature vector set and the historical dataset.

In some embodiments, the plurality of similarity scores may indicate corresponding similarity levels between the requirement request description attribute (as represented by the requirement request feature vector set) and a plurality of historical requirement description attributes in the historical dataset. For example, the plurality of similarity scores may be based on cosine similarities that measure how close the requirement request description attribute is to each of the historical requirement description attributes as projected to a vector space.

At step/operation 1109, a computing entity (such as the SME computing entity 105 described above in connection with FIG. 1 and FIG. 2) may include means (such as the processing element 205 of the SME computing entity 105 described above in connection with FIG. 2) for determining a predicted defect description attribute and/or a predicted test case description attribute.

In some embodiments, the computing entity may determine the at least one predicted defect description attribute or the at least one predicted test case description attribute based at least in part on the plurality of similarity scores. For example, the computing entity may select one or more historical requirement description attributes that are similar to the requirement request description attribute based on the plurality of similarity scores calculated at step/operation 1107. Based on the selected historical requirement description attributes, the computing entity may determine their correlated historical defect description attributes and/or historical test case description attributes, and may generate the predicted defect description attribute and/or the predicted test case description attribute based on the correlated historical defect description attributes and/or historical test case description attributes, respectively. Additional details of determining the predicted defect description attribute and the predicted test case description attribute are described in connection with at least FIG. 12 to FIG. 15.

Referring back to FIG. 11, the example method 1100 ends at step/operation 1111.

Figure 12:
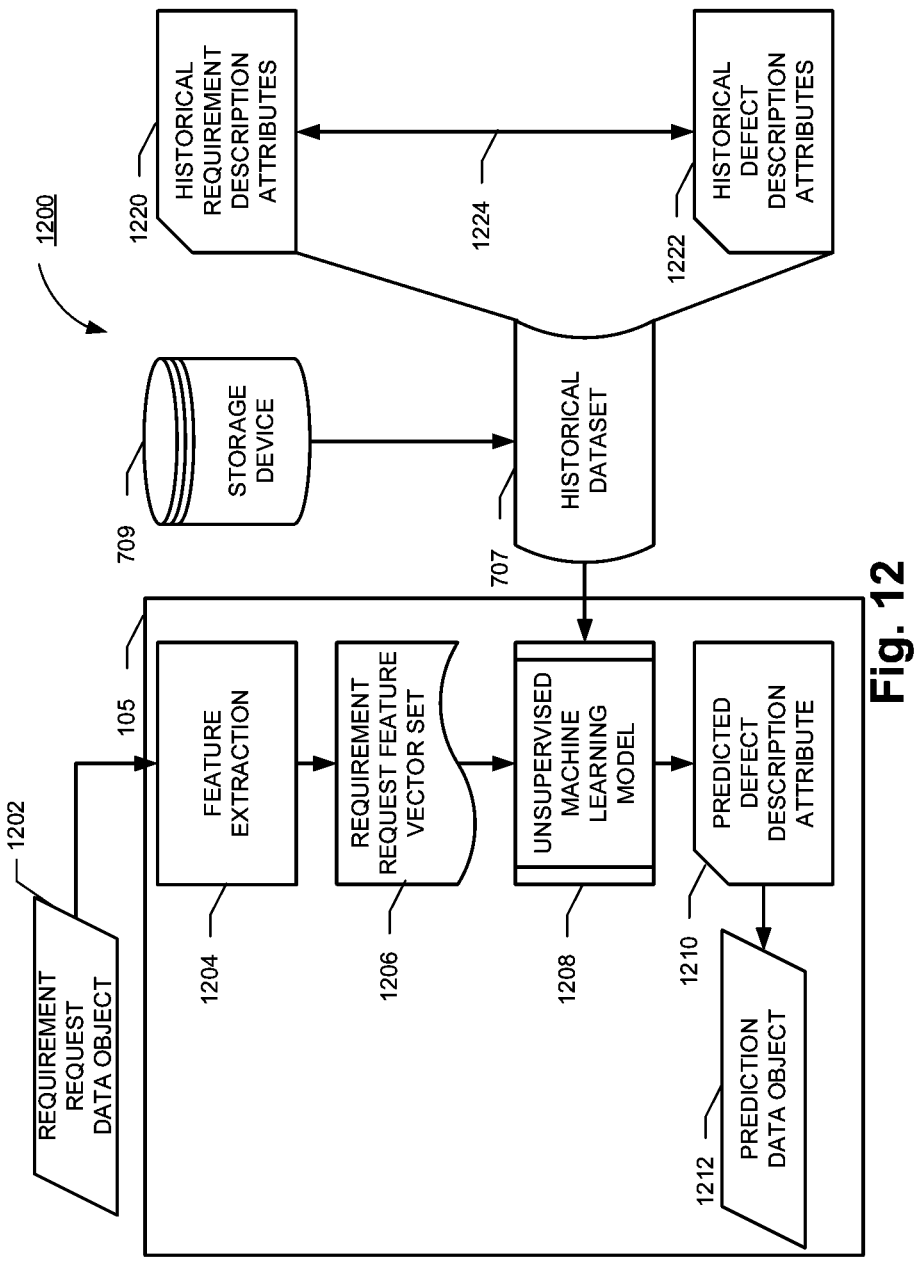

Referring now to FIG. 12, an example diagram 1200 illustrates an example of generating predicted defect description attributes in accordance with various embodiments of the present disclosure.

In the examples shown in FIG. 12, the SME computing entity 105 may receive a requirement request data object 1202, similar to at least step/operation 404 described above in connection with FIG. 4.

In some embodiments, the SME computing entity 105 may implement various processing techniques (including, but not limited to, natural language processing techniques) on the requirement request data object, similar to those described above in connection with at least FIG. 5.

In some embodiments, the SME computing entity 105 may implement techniques of feature extraction 1204 on the requirement request data object 1202 (for example, on the requirement request description attribute) to transform the requirement request description attribute into a requirement request feature vector set 1206, similar to those described above in connection with at least step/operation 1105 of FIG. 11. For example, the requirement request feature vector set 1206 may be TF-IDF vectors as described above.

In some embodiments, the SME computing entity 105 may provide the requirement request feature vector set 1206 to an unsupervised machine learning model 1208. As described in the example above, the unsupervised machine learning model 1208 may be similarity-score-based that is configured to calculate cosine similarities.

In some embodiments, the similarity scores may be calculated based on the requirement request feature vector set 1206 and the historical requirement description attribute 1220 of the historical dataset 707. In some embodiments, the historical dataset 707 may be generated by the SME computing entity 105 and/or stored by the SME computing entity 105 in the storage device 709, similar to those described above in connection with at least FIG. 6 and FIG. 7.

Referring back to FIG. 12, the plurality of similarity scores calculated by the unsupervised machine learning model 1208 may indicate corresponding similarity levels between the requirement request description attribute (as represented by the requirement request feature vector set 1206) and a plurality of historical requirement description attributes 1220 in the historical dataset 707. As described above, the historical dataset 707 may indicate a plurality of attribute correlations 1224 between a plurality of historical requirement description attributes 1220 and a plurality of historical defect description attributes 1222. In some embodiments, the computing entity may select one or more historical requirement description attributes 1220 that are similar to the requirement request description attribute (as represented by the requirement request feature vector set 1206) based on the plurality of similarity scores. The computing entity may further determine the historical defect description attributes 1222 that are correlated to the selected historical requirement description attributes 1220, and may generate the predicted defect description attribute 1210 based on the correlated historical defect description attributes 1222, additional details of which are in connection with at least FIG. 13.

Referring back to FIG. 12, in some embodiments, the SME computing entity 105 may generate a prediction data object 1212 that may comprise the predicted defect description attribute 1210. Subsequently, the SME computing entity 105 may transmit the prediction data object 1212 to a client device, similar to those described above in connection with at least step/operation 412 of FIG. 4.

Figure 13:
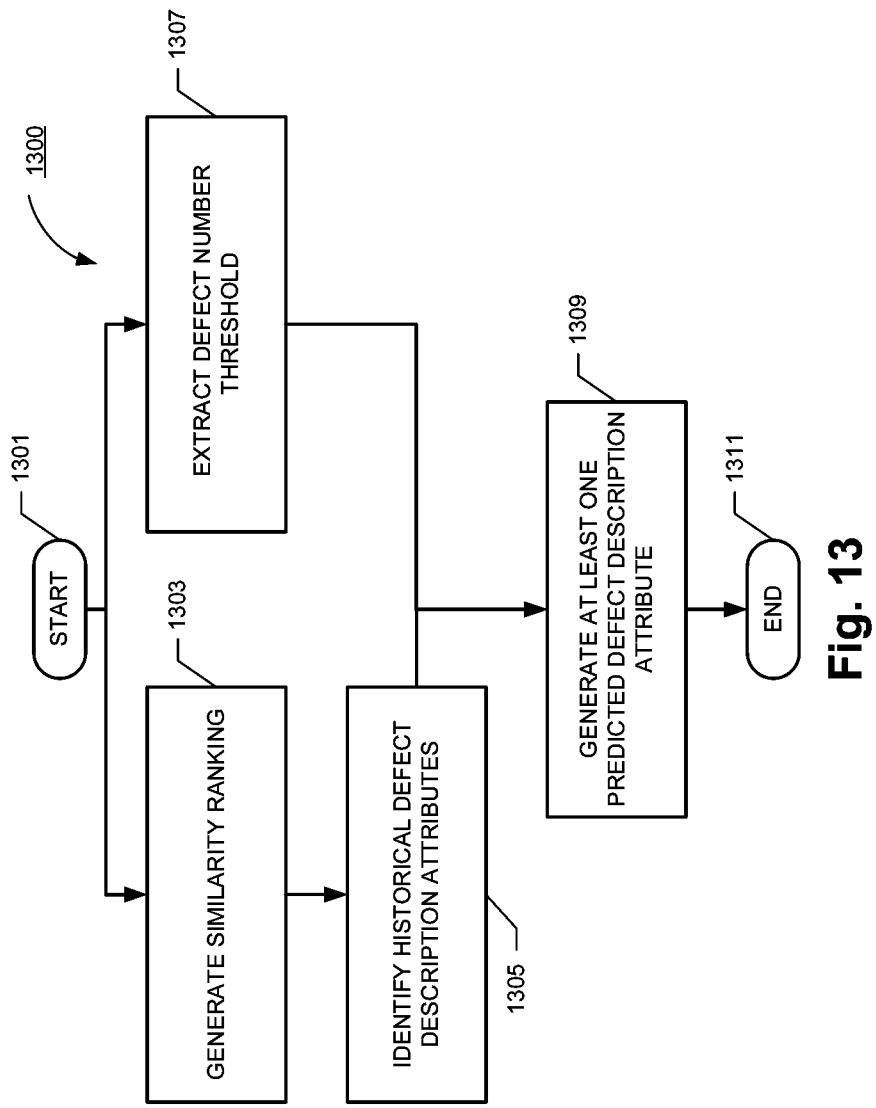

Referring now to FIG. 13, an example method 1300 illustrates example generation of example prediction data object in accordance with embodiments of the present disclosure.

The example method 1300 starts at step/operation 1301.

At step/operation 1303, a computing entity (such as the SME computing entity 105 described above in connection with FIG. 1 and FIG. 2) may include means (such as the processing element 205 of the SME computing entity 105 described above in connection with FIG. 2) for generating a similarity ranking of the plurality of historical requirement description attributes.

As described above in connection with at least step/operation 1107 of FIG. 11, the computing entity may calculate a plurality of similarity scores that may indicate corresponding similarity levels between the requirement request description attribute (as represented by the requirement request feature vector set) and a plurality of historical requirement description attributes in the historical dataset. Subsequently, the computing entity may generate a similarity ranking of the plurality of historical requirement description attributes based on their corresponding similarity scores (for example, a historical requirement description attribute associated with a high similarity score is ranked higher compared to a historical requirement description attribute associated with a low similarity score).

At step/operation 1305, a computing entity (such as the SME computing entity 105 described above in connection with FIG. 1 and FIG. 2) may include means (such as the processing element 205 of the SME computing entity 105 described above in connection with FIG. 2) for identifying the plurality of historical defect description attributes corresponding to (i.e. correlated to) the plurality of historical requirement description attributes in the similarity ranking.

As described above, the historical dataset may indicate a plurality of attribute correlations between a plurality of historical requirement description attributes and a plurality of historical defect description attributes. Based on the plurality of attribute correlations, the computing entity may determine, for each historical requirement description attribute in the similarity ranking, a corresponding historical defect description attribute.

At step/operation 1307, a computing entity (such as the SME computing entity 105 described above in connection with FIG. 1 and FIG. 2) may include means (such as the processing element 205 of the SME computing entity 105 described above in connection with FIG. 2) for extracting a defect number threshold from a requirement request data object.

As described above, the defect number threshold may indicate a number of predicted defect description attributes to be generated and included in the prediction data object.

As an example, the requirement request data object may be in the form of an API request block that comprises a "num_defects" value that indicates a defect number threshold attribute, and the computing entity may exact the "num_defects" value as the corresponding defect number threshold.

At step/operation 1309, a computing entity (such as the SME computing entity 105 described above in connection with FIG. 1 and FIG. 2) may include means (such as the processing element 205 of the SME computing entity 105 described above in connection with FIG. 2) for generating the at least one predicted defect description attribute based on the similarity ranking, the plurality of historical defect description attributes, and the defect number threshold.

For example, the defect number threshold attribute may indicate that the defect number threshold is five. In other words, the user requests that a total of five predicted defect description attributes should be included in the prediction data object. The computing entity may determine five historical defect description attributes that correspond/are correlated to the top five historical requirement description attributes in the similarity ranking, and may include these five historical defect description attributes as the predicted defect description attributes in the prediction data object.

Referring back to FIG. 13, the example method 1300 ends at step/operation 1311.

Figure 14:
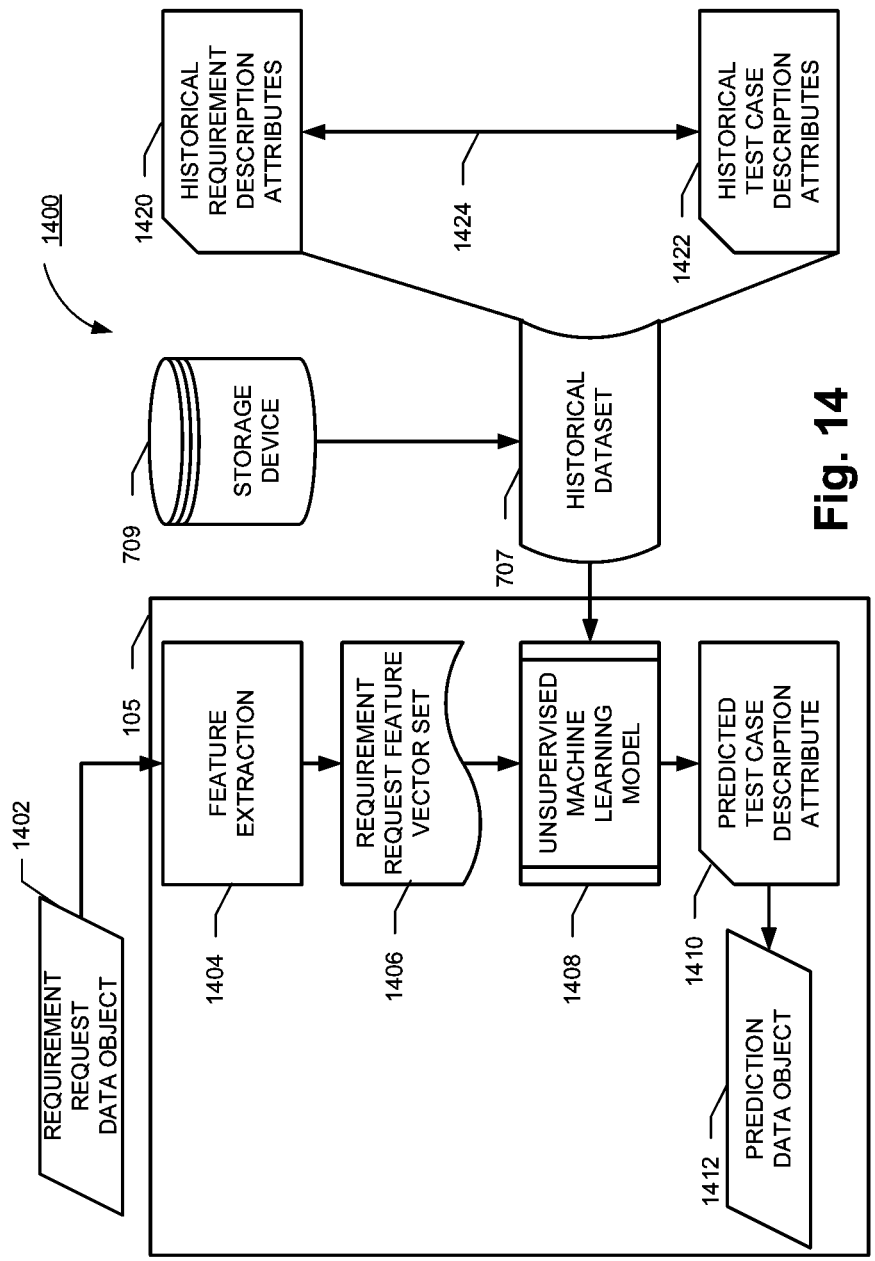

Referring now to FIG. 14, an example diagram 1400 illustrates an example of generating predicted test case description attributes in accordance with various embodiments of the present disclosure.

In the examples shown in FIG. 14, the SME computing entity 105 may receive a requirement request data object 1402, similar to at least step/operation 404 described above in connection with FIG. 4.

In some embodiments, the SME computing entity 105 may implement various processing techniques (including, but not limited to, natural language processing techniques) on the requirement request data object, similar to those described above in connection with at least FIG. 5.

In some embodiments, the SME computing entity 105 may implement techniques of feature extraction 1404 on the requirement request data object 1402 (for example, on the requirement request description attribute) to transform the requirement request description attribute into a requirement request feature vector set 1406, similar to those described above in connection with at least step/operation 1105 of FIG. 11. For example, the requirement request feature vector set 1406 may be TF-IDF vectors as described above.

In some embodiments, the SME computing entity 105 may provide the requirement request feature vector set 1406 to an unsupervised machine learning model 1408. As described in the example above, the unsupervised machine learning model 1408 may be similarity-score-based that is configured to calculate cosine similarities.

In some embodiments, the similarity scores may be calculated based on the requirement request feature vector set 1406 and the historical requirement description attribute 1420 of the historical dataset 707. In some embodiments, the historical dataset 707 may be generated by the SME computing entity 105 and/or stored by the SME computing entity 105 in the storage device 709, similar to those described above in connection with at least FIG. 6 and FIG. 7.

Referring back to FIG. 14, the plurality of similarity scores calculated by the unsupervised machine learning model 1408 may indicate corresponding similarity levels between the requirement request description attribute (as represented by the requirement request feature vector set 1406) and a plurality of historical requirement description attributes 1420 in the historical dataset 707. As described above, the historical dataset 707 may indicate a plurality of attribute correlations 1424 between a plurality of historical requirement description attributes 1420 and a plurality of historical test case description attributes 1422. In some embodiments, the computing entity may select one or more historical requirement description attributes 1420 that are similar to the requirement request description attribute (as represented by the requirement request feature vector set 1406) based on the plurality of similarity scores. The computing entity may further determine historical test case description attributes 1422 that are correlated to the selected historical requirement description attributes 1420, and may generate the predicted test case description attribute 1410 based on the correlated historical test case description attributes 1422, additional details of which are in connection with at least FIG. 15.

Referring back to FIG. 14, in some embodiments, the SME computing entity 105 may generate a prediction data object 1412 that may comprise the predicted test case description attribute 1410. Subsequently, the SME computing entity 105 may transmit the prediction data object 1412 to a client device, similar to those described above in connection with at least step/operation 412 of FIG. 4.

Referring now to FIG. 15, an example method 1500 illustrates example generation of example prediction data object in accordance with embodiments of the present disclosure.

The example method 1500 starts at step/operation 1501.

At step/operation 1503, a computing entity (such as the SME computing entity 105 described above in connection with FIG. 1 and FIG. 2) may include means (such as the processing element 205 of the SME computing entity 105 described above in connection with FIG. 2) for generating a similarity ranking of the plurality of historical requirement description attributes.

As described above in connection with at least step/operation 1107 of FIG. 11, the computing entity may calculate a plurality of similarity scores that may indicate corresponding similarity levels between the requirement request description attribute (as represented by the requirement request feature vector set) and a plurality of historical requirement description attributes in the historical dataset. Subsequently, the computing entity may generate a similarity ranking of the plurality of historical requirement description attributes based on their corresponding similarity scores (for example, a historical requirement description attribute associated with a high similarity score is ranked higher compared to a historical requirement description attribute associated with a low similarity score).

At step/operation 1505, a computing entity (such as the SME computing entity 105 described above in connection with FIG. 1 and FIG. 2) may include means (such as the processing element 205 of the SME computing entity 105 described above in connection with FIG. 2) for identifying the plurality of historical test case description attributes corresponding to (or correlated to) the plurality of historical requirement description attributes in the similarity ranking.

As described above, the historical dataset may indicate a plurality of attribute correlations between a plurality of historical requirement description attributes and a plurality of historical test case description attributes. Based on the plurality of attribute correlations, the computing entity may determine, for each historical requirement description attribute in the similarity ranking, a corresponding historical test case description attribute.

At step/operation 1507, a computing entity (such as the SME computing entity 105 described above in connection with FIG. 1 and FIG. 2) may include means (such as the processing element 205 of the SME computing entity 105 described above in connection with FIG. 2) for extracting a test case number threshold from a requirement request data object.

As described above, the test case number threshold may indicate a number of predicted test case description attributes to be generated and included in the prediction data object.

As an example, the requirement request data object may be in the form of an API request block that comprises a "num_testcases" value that indicates a test case number threshold attribute, and the computing entity may exact the "num_testcases" value as the corresponding test case number threshold.

At step/operation 1509, a computing entity (such as the SME computing entity 105 described above in connection with FIG. 1 and FIG. 2) may include means (such as the processing element 205 of the SME computing entity 105 described above in connection with FIG. 2) for generating the at least one predicted test case description attribute based on the similarity ranking, the plurality of historical test case description attributes, and the test case number threshold.

For example, the test case number threshold attribute may indicate that the test case number threshold is five. In other words, the user requests that a total of five predicted test case description attributes should be included in the prediction data object. The computing entity may determine five historical test case description attributes that correspond to (or are correlated to) the top five historical requirement description attributes in the similarity ranking, and may include these five historical test case description attributes as the predicted test case description attributes in the prediction data object.

Referring back to FIG. 15, the example method 1500 ends at step/operation 1511.

V. CONCLUSION

Many modifications and other embodiments of the disclosure set forth herein will come to mind to one skilled in the art to which this disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus comprising one or more processors and at least one non-transitory memory comprising computer program code, the at least one non-transitory memory and the computer program code configured to, with the one or more processors, cause the apparatus to:
    receive, originating from a client device, a requirement request data object, wherein the requirement request data object comprises at least: (i) a requirement request description attribute for a software testing task and (ii) a test case number threshold attribute indicating a test case number threshold for testing an objective associated with the requirement request description attribute;
    generate, based at least in part on the requirement request description attribute and using a supervised machine learning model, at least one of (i) a predicted complexity attribute or iii) a predicted work track attribute corresponding to the requirement request data object;
    determine, based at least in part on the requirement request description attribute, a requirement request feature vector set;
    determine, using an unsupervised machine learning model, a plurality of similarity scores associated with the requirement request feature vector set and a historical dataset,
    determine a similarity ranking for a plurality of historical requirement description attributes based at least in part on the plurality of similarity scores;
    generate at least one predicted defect description attribute corresponding to the requirement request data object based at least in part on the similarity ranking and a plurality of historical defect description attributes, wherein the at least one predicted defect description attribute describes a predicted defect within a software component;
    generate, based at least in part on (i) the requirement request description attribute, (ii) the at least one predicted defect description attribute, and (iii) the test case number threshold attribute, at least one predicted test case description attribute corresponding to the requirement request data object; and
    transmit, to the client device, a prediction data object, wherein:
    (i) the prediction data object comprises at least one of the predicted complexity attribute, the predicted work track attribute, the at least one predicted defect description attribute, or the at least one predicted test case description attribute, and (ii) the client device is configured to perform one or more software testing operations corresponding to the software testing task based at least in part on the prediction data object.

2. The apparatus of claim 1, wherein, subsequent to receiving the requirement request data object originating from the client device, the at least one non-transitory memory and the computer program code are configured to, with the one or more processors, cause the apparatus to further:
identify, based at least in part on a domain-specific rule associated with the requirement request data object, a domain-specific abbreviation text from the requirement request description attribute; and
convert, based at least in part on the domain-specific rule, the domain-specific abbreviation text to a domain-specific expansion text.

3. The apparatus of claim 1, wherein the at least one non-transitory memory and the computer program code are configured to, with the one or more processors, cause the apparatus to further:
receive at least one of a historical requirement data object, a historical defect data object, or a historical test case data object;
generate the historical dataset based at least in part on the at least one of the historical requirement data object, the historical defect data object, or the historical test case data object; and
store, in a database, the historical dataset.

4. The apparatus of claim 3, wherein the historical requirement data object comprises at least one of a historical requirement identifier attribute, a historical requirement description attribute, or a work track attribute.

5. The apparatus of claim 3, wherein the historical defect data object comprises at least one of a historical defect identifier attribute, a historical defect description attribute, or a work track attribute.

6. The apparatus of claim 3, wherein the historical test case data object comprises at least one of a historical test case identifier attribute, a historical test case description attribute, or a work track attribute.

7. The apparatus of claim 3, wherein generating the historical dataset comprises:
merging at least two of (i) a historical requirement description attribute of the historical requirement data object, (ii) a historical defect description attribute of the historical defect data object, or (iii) a historical test case description attribute of the historical test case data object.

8. The apparatus of claim 3, wherein generating at least one of the predicted complexity attribute or the predicted work track attribute corresponding to the requirement request data object comprises:
receiving the historical dataset from the database; and
generating at least one of the predicted complexity attribute or the predicted work track attribute based at least in part on the requirement request description attribute, the historical dataset and the supervised machine learning model.

9. The apparatus of claim 8, wherein the requirement request data object further comprises a confidence score threshold attribute indicating a confidence score threshold, and wherein the at least one non-transitory memory and the computer program code are configured to, with the one or more processors, cause the apparatus to further:
determine a candidate work track attribute based at least in part on the requirement request description attribute, the historical dataset, and the supervised machine learning model;
determine a confidence score associated with the candidate work track attribute; and
determine whether the confidence score satisfies the confidence score threshold.

10. The apparatus of claim 1, wherein the historical dataset indicates a plurality of attribute correlations between the plurality of historical requirement description attributes and the plurality of historical defect description attributes, and wherein the plurality of similarity scores indicate corresponding similarity levels between the requirement request description attribute and the plurality of historical requirement description attributes.

11. The apparatus of claim 10, wherein the requirement request data object comprises a defect number threshold attribute indicating a defect number threshold, and wherein the at least one non-transitory memory and the computer program code are configured to, with the one or more processors, cause the apparatus to further:
identify the plurality of historical defect description attributes corresponding to the plurality of historical requirement description attributes in the similarity ranking based at least in part on the plurality of attribute correlations; and
generate, using the unsupervised machine learning model, the at least one predicted defect description attribute corresponding to the requirement request data object based at least in part on the similarity ranking, the plurality of historical defect description attributes, and the defect number threshold.

12. The apparatus of claim 1, wherein the historical dataset indicates a plurality of attribute correlations between the plurality of historical requirement description attributes and a plurality of historical test case description attributes, wherein the plurality of similarity scores indicate corresponding similarity levels between the requirement request description attribute and the plurality of historical requirement description attributes.

13. The apparatus of claim 12, wherein the at least one non-transitory memory and the computer program code are configured to, with the one or more processors, cause the apparatus to further:
identify the plurality of historical test case description attributes corresponding to the plurality of historical requirement description attributes in the similarity ranking based at least in part on the plurality of attribute correlations; and
generate the at least one predicted test case description attribute based at least in part on the similarity ranking, the plurality of historical test case description attributes, and the test case number threshold.

14. A computer-implemented method comprising:
receiving, by one or more processors and originating from a client device, a requirement request data object, wherein the requirement request data object comprises (i) at least a requirement request description attribute for a software testing task and (ii) a test case number threshold attribute indicating a test case number threshold for testing an objective associated with the requirement request description attribute;
generating, by the one or more processors and based at least in part on the requirement request description attribute and using a supervised machine learning model, at least one of (i) a predicted complexity attribute and (ii) a predicted work track attribute corresponding to the requirement request data object;

determining, by the one or more processors and based at least in part on the requirement request description attribute, a requirement request feature vector set;

determining, by the one or more processors and based at least in part on an unsupervised machine learning model, a plurality of similarity scores associated with the requirement request feature vector set and a historical dataset;

determining, by the one or more processors and a similarity ranking for a plurality of historical requirement description attributes based at least in part on the plurality of similarity scores;

generating, by the one or more processors, at least one predicted defect description attribute corresponding to the requirement request data object based at least in part on the similarity ranking and a plurality of historical defect description attributes, wherein the at least one predicted defect description attribute describes a predicted defect within a software component;

generating, by the one or more processors and based at least in part on (i) the requirement request description attribute, (ii) the at least one predicted defect description attribute, and (iii) the test case number threshold attribute, and at least one predicted test case description attribute corresponding to the requirement request data object, wherein the at least one predicted test case description attribute is generated based at least in part on the test case number threshold; and transmitting, to the client device and by the one or more processors, a prediction data object, wherein:
(i) the prediction data object comprises the predicted complexity attribute, the predicted work track attribute, the at least one predicted defect description attribute, and the at least one predicted test case description attribute, and
(ii) the client device is configured to perform one or more software testing operations corresponding to the software testing task based at least in part on the prediction data object.

15. The computer-implemented method of claim 14, wherein, subsequent to receiving the requirement request data object originating from the client device, the computer-implemented method further comprises:

identifying, based at least in part on a domain-specific rule associated with the requirement request data object and by the one or more processors, a domain-specific abbreviation text from the requirement request description attribute; and converting, based at least in part on the domain-specific rule and by the one or more processors, the domain-specific abbreviation text to a domain-specific expansion text.

16. The computer-implemented method of claim 14, further comprising:

receiving a historical requirement data object, a historical defect data object, and a historical test case data object;

generating, by the one or more processors, the historical dataset based at least in part on the historical requirement data object, the historical defect data object, and the historical test case data object; and storing, in a database and by the one or more processors, the historical dataset.

17. A computer program product comprising at least one non-transitory computer-readable storage medium having computer-readable program code portions stored therein, the computer-readable program code portions comprising an executable portion configured to:

receive, originating from a client device, a requirement request data object, wherein the requirement request data object comprises at least (i) a requirement request description attribute for a software testing task and (ii) a test case number threshold attribute indicating a test case number threshold for testing an objective associated with the requirement request description attribute;

generate, based at least in part on the requirement request description attribute and a supervised machine learning model, at least one of (i) a predicted complexity attribute or (ii) a predicted work track attribute corresponding to the requirement request data object;

determine, based at least in part on the requirement request description attribute, a requirement request feature vector set;

determine, based at least in part on an unsupervised machine learning model, a plurality of similarity scores associated with the requirement request feature vector set and a historical dataset;

determine a similarity ranking for a plurality of historical requirement description attributes based at least in part on the plurality of similarity scores;

generate at least one predicted defect description attribute corresponding to the requirement request data object based at least in part on the similarity ranking and a plurality of historical defect description attributes, wherein the at least one predicted defect description attribute describes a predicted defect within a software component;

generate, based at least in part on (i) the requirement request description attribute, (ii) the at least one predicted defect description attribute, and (iii) the test case number threshold, at least one predicted test case description attribute corresponding to the requirement request data object; and transmit, to the client device, a prediction data object, wherein:
(i) the prediction data object comprises at least one of the predicted complexity attribute, the predicted work track attribute, the at least one predicted defect description attribute, or the at least one predicted test case description attribute, and
(ii) the client device is configured to perform one or more software testing operations corresponding to the software testing task based at least in part on the prediction data object.

18. The computer program product of claim 17, wherein the executable portion is configured to further:

identify, based at least in part on a domain-specific rule associated with the requirement request data object, a domain-specific abbreviation text from the requirement request description attribute; and convert, based at least in part on the domain-specific rule, the domain-specific abbreviation text to a domain-specific expansion text.

19. The computer program product of claim 17, wherein the executable portion is configured to further:

receive at least one of a historical requirement data object, a historical defect data object, or a historical test case data object;

generate the historical dataset based at least in part on the at least one of the historical requirement data object, the historical defect data object, or the historical test case data object; and store, in a database, the historical dataset.

* * * * *

UNITED STATES PATENT AND TRADEMARK OFFICE
CERTIFICATE OF CORRECTION

PATENT NO. : 11,720,481 B2
APPLICATION NO. : 17/247463
DATED : August 8, 2023
INVENTOR(S) : Kumar Shailendra et al.

It is certified that error appears in the above-identified patent and that said Letters Patent is hereby corrected as shown below:

In the Claims

In Column 44, Line 36, Claim 1, delete "iii)" and insert -- (ii) --, therefor.

In Column 44, Line 44, Claim 1, delete "dataset," and insert -- dataset; --, therefor.

In Column 45, Line 60, Claim 8, delete "dataset and" and insert -- dataset, and --, therefor.

Signed and Sealed this
Seventh Day of November, 2023

Katherine Kelly Vidal
*Director of the United States Patent and Trademark Office*